(12) United States Patent
Allstadt et al.

(10) Patent No.: US 8,010,244 B2
(45) Date of Patent: *Aug. 30, 2011

(54) INTERVISIBILITY DETERMINATION

(75) Inventors: Mark Allstadt, Endicott, NY (US);
Marc Blais, Endicott, NY (US); Ira S. Glickstein, The Villages, FL (US); Peter N. Stiles, Owego, NY (US); Ronald Vienneau, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1021 days.

This patent is subject to a terminal disclaimer.

(21) Appl. No.: 11/854,488

(22) Filed: Sep. 12, 2007

(65) Prior Publication Data

US 2010/0268746 A1    Oct. 21, 2010

Related U.S. Application Data

(62) Division of application No. 11/062,693, filed on Feb. 23, 2005, now Pat. No. 7,280,897.

(60) Provisional application No. 60/574,924, filed on May 28, 2004.

(51) Int. Cl.
*G01C 5/00* (2006.01)

(52) U.S. Cl. .............. 701/9; 701/14; 701/300; 340/961; 342/62

(58) Field of Classification Search ................. 701/9, 14, 701/300, 5; 340/961; 342/65
See application file for complete search history.

(56) References Cited

U.S. PATENT DOCUMENTS

| | | | |
|---|---|---|---|
| 4,876,651 A | 10/1989 | Dawson et al. | |
| 4,903,216 A | 2/1990 | Huss et al. | |
| 4,931,954 A | 6/1990 | Honda et al. | |
| 4,970,682 A | 11/1990 | Beckwith, Jr. et al. | |
| 5,041,992 A | 8/1991 | Cunningham et al. | |
| 5,086,396 A | 2/1992 | Waruszewski, Jr. | |
| 5,179,638 A | 1/1993 | Dawson et al. | |
| 5,222,205 A | 6/1993 | Larson et al. | |
| 5,278,946 A | 1/1994 | Shimada et al. | |

(Continued)

FOREIGN PATENT DOCUMENTS

EP    0 337 338 B1    12/1996

(Continued)

OTHER PUBLICATIONS

Office Action dated Jun. 2, 2008 in U.S. Appl. No. 11/014,705.

(Continued)

*Primary Examiner* — Mark Hellner
(74) *Attorney, Agent, or Firm* — Miles & Stockbridge P.C.; James T. Carmichael; Stephen W. Aycock, II

(57) ABSTRACT

A system and method for efficient intervisibility determination. The intervisibility determination method of the present invention provides a multiple threat processing capability within a specified area of terrain using a common database. Computation is simplified through the method of processing data posts in the terrain elevation database. By taking integer steps and incrementing distance, x or y, and a predicted elevation value at each step, a small number of operations may be performed. Recomputing a change in elevation value may be reduced. An umbra database provides an enhanced look-up capability for displaying and updating the intervisibility display information. The systems and methods of the present invention may be suitable for use on a vehicle and in mission management activities.

21 Claims, 25 Drawing Sheets

U.S. PATENT DOCUMENTS

| | | | |
|---|---|---|---|
| 5,319,744 | A | 6/1994 | Kelly et al. |
| 5,355,442 | A | 10/1994 | Paglieroni et al. |
| 5,428,744 | A | 6/1995 | Webb et al. |
| 5,506,947 | A | 4/1996 | Taubin |
| 5,526,260 | A | 6/1996 | Kodet et al. |
| 5,574,915 | A | 11/1996 | Lemon et al. |
| 5,630,035 | A | 5/1997 | Gjullin et al. |
| 5,631,640 | A | 5/1997 | Deis et al. |
| 5,673,376 | A | 9/1997 | Ray et al. |
| 5,767,857 | A | 6/1998 | Neely |
| 5,781,195 | A | 7/1998 | Marvin |
| 5,831,624 | A | 11/1998 | Tarolli et al. |
| 5,838,262 | A | 11/1998 | Kershner |
| 5,977,990 | A | 11/1999 | Kowalski |
| 6,034,694 | A | 3/2000 | Evans et al. |
| 6,047,236 | A | 4/2000 | Hancock et al. |
| 6,057,861 | A | 5/2000 | Lee et al. |
| 6,097,397 | A | 8/2000 | Lee |
| 6,124,864 | A | 9/2000 | Madden et al. |
| 6,128,019 | A | 10/2000 | Crocker, III et al. |
| 6,169,550 | B1 | 1/2001 | Jain |
| 6,184,894 | B1 | 2/2001 | Rosman et al. |
| 6,191,791 | B1 | 2/2001 | Dyer et al. |
| 6,191,795 | B1 | 2/2001 | Liepa |
| 6,222,555 | B1 | 4/2001 | Christofferson et al. |
| 6,232,980 | B1 | 5/2001 | Liepa |
| 6,262,741 | B1 | 7/2001 | Davies |
| 6,288,721 | B1 | 9/2001 | Donoghue et al. |
| 6,304,268 | B1 | 10/2001 | Lourcha et al. |
| 6,308,132 | B1 | 10/2001 | Wilson et al. |
| 6,317,690 | B1 | 11/2001 | Gia |
| 6,320,592 | B1 | 11/2001 | Evans et al. |
| 6,346,948 | B1 | 2/2002 | Evans et al. |
| 6,401,038 | B2 | 6/2002 | Gia |
| 6,404,431 | B1 | 6/2002 | Farmer |
| 6,430,548 | B1 | 8/2002 | Deis et al. |
| 6,434,481 | B2 | 8/2002 | Winter et al. |
| 6,476,813 | B1 | 11/2002 | Hansen |
| 6,501,482 | B1 | 12/2002 | Rosman et al. |
| 6,529,821 | B2 | 3/2003 | Tomasi et al. |
| 6,559,853 | B1 | 5/2003 | Hashimoto et al. |
| 6,570,578 | B1 | 5/2003 | Smirnov et al. |
| 6,583,790 | B1 | 6/2003 | Wolters |
| 6,593,947 | B1 | 7/2003 | Ashe et al. |
| 6,600,489 | B2 | 7/2003 | Cook |
| 6,618,049 | B1 | 9/2003 | Hansen |
| 6,646,647 | B1 | 11/2003 | Surgutchik et al. |
| 6,661,424 | B1 | 12/2003 | Alcorn et al. |
| 6,677,957 | B2 | 1/2004 | Grzeszczuk et al. |
| 6,697,062 | B1 | 2/2004 | Cabral et al. |
| 6,707,452 | B1 | 3/2004 | Veach |
| 7,242,407 | B2 | 7/2007 | Blais |
| 7,280,897 | B2 * | 10/2007 | Allstadt et al. .................... 701/9 |
| 7,486,840 | B2 | 2/2009 | Blais |
| 7,492,965 | B2 | 2/2009 | Blais |
| 2001/0020948 | A1 | 9/2001 | Piazza et al. |
| 2001/0024203 | A1 | 9/2001 | Yamada et al. |
| 2002/0033821 | A1 | 3/2002 | Sfarti |
| 2002/0158897 | A1 | 10/2002 | Besaw et al. |
| 2003/0034981 | A1 | 2/2003 | Wada |
| 2003/0191766 | A1 | 10/2003 | Elin |
| 2004/0007121 | A1 | 1/2004 | Graves et al. |
| 2004/0015512 | A1 | 1/2004 | Ashe et al. |
| 2004/0030492 | A1 | 2/2004 | Fox et al. |
| 2005/0267652 | A1 | 12/2005 | Allstadt et al. |

FOREIGN PATENT DOCUMENTS

| | | |
|---|---|---|
| WO | 95/19544 | 7/1995 |
| WO | 95/19545 | 7/1995 |
| WO | 95/19546 | 7/1995 |

OTHER PUBLICATIONS

Office Action dated Jun. 2, 2008 in U.S. Appl. No. 11/015,305.
Notice of Allowance dated Oct. 2, 2008 in U.S. Appl. No. 11/015,305.
*Three-Dimensional Intervisibility Algorithm*, IBM Technical Disclosure Bulletin, Jul. 1991, pp. 61-66.
*Terrain Exposure Factor*, IBM Technical Disclosure Bulletin, Jan. 1994, pp. 649-652.
Notice of Allowance dated Oct. 9, 2008, in U.S. Appl. No. 11/014,705.
Notice of Allowance dated May 29, 2007 in U.S. Appl. No. 11/062,693.
Notice of Allowance dated Mar. 6, 2007, in U.S. Appl. No. 10/957,621.
Office Action dated Jun. 11, 2009, in U.S. Appl. No. 12/364,367.
Office Action dated Nov. 12, 2009, in U.S. Appl. No. 12/372,497.
Notice of Allowance dated Feb. 4, 2010, in U.S. Appl. No. 12/364,367.
Notice of Allowance dated Apr. 2, 2010, in U.S. Appl. No. 12/372,497.

\* cited by examiner

INTERVISIBILITY DETERMINATION

This application is a divisional of application Ser. No. 11/062,693 filed Feb. 23, 2005 now U.S. Pat. No. 7,280,897, and claims the benefit of U.S. Provisional Application No. 60/574,924, filed May 28, 2004, which is incorporated herein by reference.

The present invention relates generally to mission management and, more particularly, to determining intervisibility.

Mission management, as used herein, includes activities such as mission planning, threat avoidance, sensor coverage estimation, contingency management, prioritizing threats, route planning, and/or the like. Intervisibility, as used herein, refers to a line of sight between a selected point, such as a threat location, and an observer, such as an aircraft. An intervisibility determination may be an important consideration in the navigation of a vehicle. For example, an aircraft pilot may desire to navigate his aircraft in such a manner as to avoid the possibility of being detected by enemy radar coupled to an anti-aircraft missile or artillery unit.

Typically, the word "threat" refers to a hostile or dangerous entity. A threat, as used herein, may refer to another aircraft, a vehicle, a person, or a facility that presents a danger or hostility to the observer. Additionally, a threat may also be used more generally to refer to another aircraft, a vehicle, a person or a facility that does not present a danger or hostility, but where a desire exists to determine intervisibility based on an observation point, such as, for example, an aircraft. In other words, the systems and methods of the present invention for determination of intervisibility have application in military vehicles, as well as in commercial or private vehicles. For example, a commercial airliner pilot may desire to know whether there is intervisibility between the airliner and a ground-based radar installation for purposes of navigation and communication.

In addition to intervisibility determination for piloted aircraft, the intervisibility information generated by the systems and methods of the present invention may be used by an unmanned aircraft, such as, for example, an Unmanned Aerial Vehicle (UAV). Much like an operator of a manned vehicle, a UAV may use intervisibility information for multiple purposes, such as, for example, route planning, navigation, attack, reconnaissance, and/or the like.

Briefly, the systems and methods of the present invention provide for efficient intervisibility determination of single or multiple threats and, optionally, display of the intervisibility information to assist an operator of a vehicle in navigation. Further, the system and methods of the present invention may be used to determine intervisibility between single or multiple observation points and single or multiple threats. As input, the systems and methods of the present invention receive a terrain elevation database. The terrain elevation database is comprised of data points, each of which correspond to a geographic location. The geographic locations are uniformly spaced in both the x and y directions. If the database is in a form that is not uniformly spaced, such as, for example, a Digital Terrain Elevation Database (DTED), then the database may be pre-processed to create an intermediate database having a uniform spacing of locations in both axes. Next, an umbra database is created, where each umbra database cell corresponds to a terrain elevation database data point. As used herein, a data element of a database may be referred to interchangeably as a data point or a database cell. Threat data comprising a threat location and a threat range capability for threats within the area of terrain covered by the terrain elevation database is received. A number of line of sight vectors are selected. Each line of sight vector emanates from a threat location and extends to the range of the threat. Each line of sight vector is traversed and a minimum visible elevation is computed for each terrain elevation database cell and stored in the corresponding umbra database location. Once all line of sight vectors for a given threat have been traversed and processed, the processing continues to a next threat, if a next threat is present. Once all threats have been processed for the given area of terrain, the umbra database may then be used in conjunction with the potential observation locations and altitudes to determine intervisibility for the observation point(s).

BRIEF DESCRIPTION OF THE DRAWINGS

The present invention will be described with reference to the accompanying drawings, wherein.

DETAILED DESCRIPTION

Figure 1:
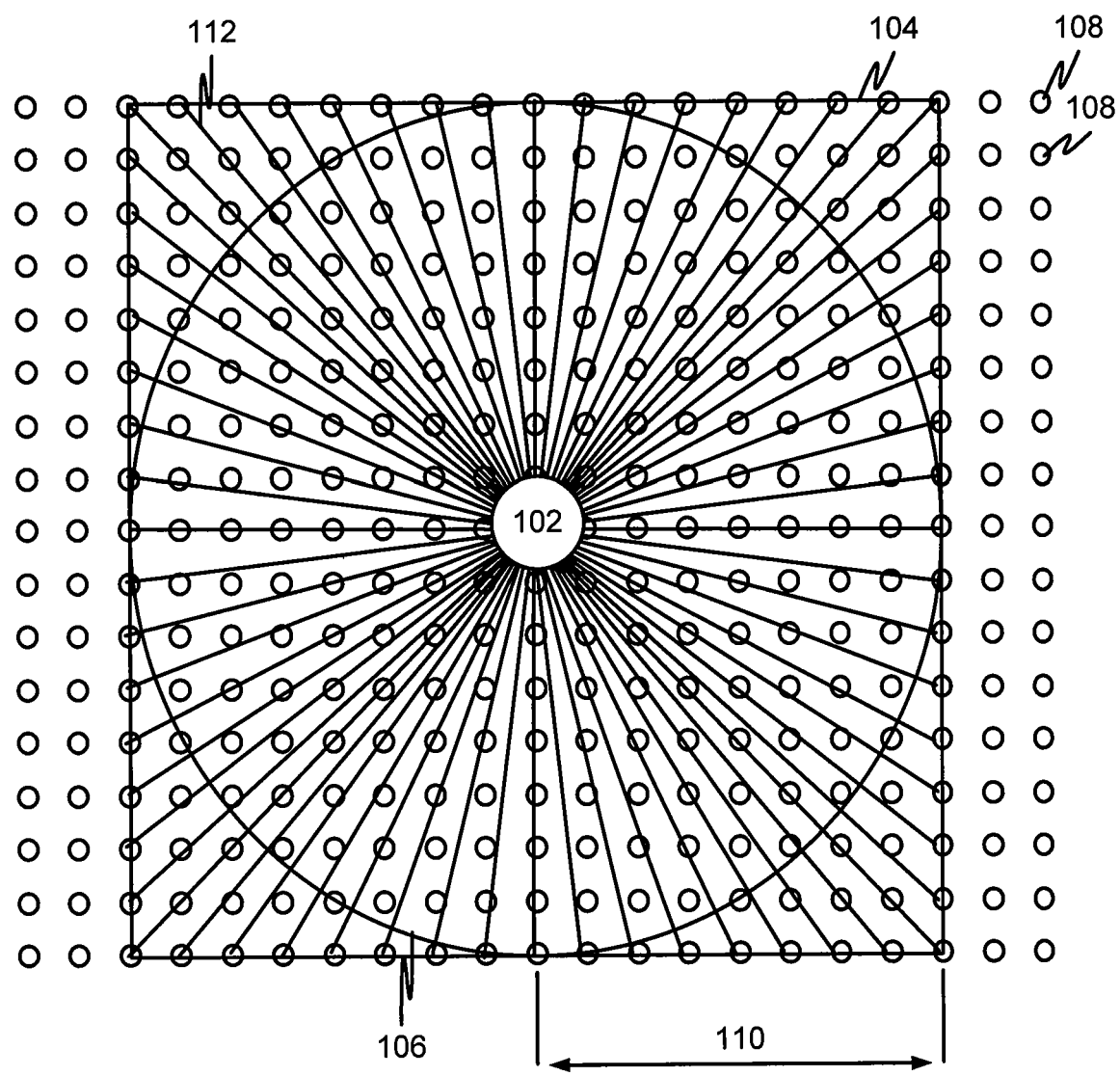
FIG. 1 is a diagram of a portion of an exemplary terrain elevation cell array with a threat overlaid.

In general terms, the input data used for determining intervisibility in accordance with the present invention comprises a terrain elevation database, threat data, an umbra database, and observation point data.

In an exemplary embodiment, the terrain elevation database contains data representative of the terrain elevation features of a particular region or area, such as, for example, a Digital Terrain Elevation Database (DTED). Each element of data in the database, commonly referred to as a cell or data post, stores terrain data that is based on the scale of the digital map. In other words, each cell in the database is representative of a certain area of terrain.

In an exemplary embodiment, the threat data contains a threat location and a threat range. Further, the systems and methods of the present invention are capable of processing multiple threats for a given area. Therefore, threat data may contain threat information for multiple threats.

In an exemplary embodiment, the umbra database contains an array of cells that corresponds to the array of cells in the terrain elevation database. The cells in the umbra database are used to store the minimum visible elevation values that are calculated during intervisibility processing in accordance with the present invention. Umbra, as defined by Webster's Revised Unabridged dictionary, refers to the conical shadow projected from a planet or satellite, on the side opposite to the sun, within which a spectator could see no portion of the sun's disk. However, as used herein, umbra is used to indicate association with computed intervisibility data. The phrase "umbra value" is used herein to refer to an intervisibility value, such as, for example, minimum visible elevation, for a particular terrain elevation database cell. The phrase "umbra database" is used herein to refer to a database containing umbra values.

In an exemplary embodiment, the observation point data comprises an observer location and observer altitude. However, it should be appreciated that the systems and methods of the present invention may be used for determining intervisibility between single or multiple threats and single or multiple observation points. The observation point data may be used in a last step of intervisibility determination. The umbra database is used in conjunction with the observation point data to determine for a given observation point location and altitude, or elevation, each point in the umbra database, or selected portion of the umbra database, where the observer may be visible to a threat. Once the determination of intervisibility is computed, the results may be displayed to an operator, such as, for example, a pilot of an aircraft, so that the operator may take intervisibility information into account when navigating the vehicle. In addition the results of intervisibility determination may be used for other mission management activities, such as, for example, automated mission management or mission planning. Wherein the vehicle may be an aircraft, a terrestrial vehicle, a boat, a spacecraft, or other vehicle or platform capable of housing or using the systems and methods of the present invention.

FIG. 1 is a diagram of a portion of an exemplary terrain elevation database with an exemplary threat overlaid. In particular, a cell array 108 represents a portion of an exemplary terrain elevation database comprised of an array of cells, wherein each cell is used to store a value that is representative of the terrain elevation, such as, for example, the elevation of that point, the elevation representative of an average or composite of the surrounding area, or the highest elevation within the area represented by the cell. The cell array 108 is shown with a threat location 102 overlaid. The threat located at threat location 102 has a threat range circle 106. The threat range circle 106 encompasses an area in which the threat may have capabilities for sensing, action, and/or the like. The radius of the threat range circle 106 is equal to the threat range 110.

In order to compute umbra values, a number of line of sight vectors 112 emanating from the threat location 102 are used as reference lines. The number of line of sight vectors may be predetermined, or dynamically determined. In an exemplary embodiment, the number of line of sight vectors used may be a function of threat range, terrain data, and/or the like. In another exemplary embodiment, the number of line of sight vectors is a fixed, predetermined number. The method of selecting the number of vectors to be used may depend on the contemplated use of the invention in a particular embodiment. The terrain database comprising a cell 108 array corresponds to geographic locations. In an exemplary embodiment, the distance between geographic locations represented by each terrain elevation database cell 108 is constant in both x and y dimensions. That is, geographic locations corresponding to adjacent data points of the database are uniformly spaced in a first direction (x axis) and a second direction perpendicular to the first (y axis). However, it should be appreciated that other scales and methods of representing the terrain in the terrain elevation database may be used.

Figure 2:
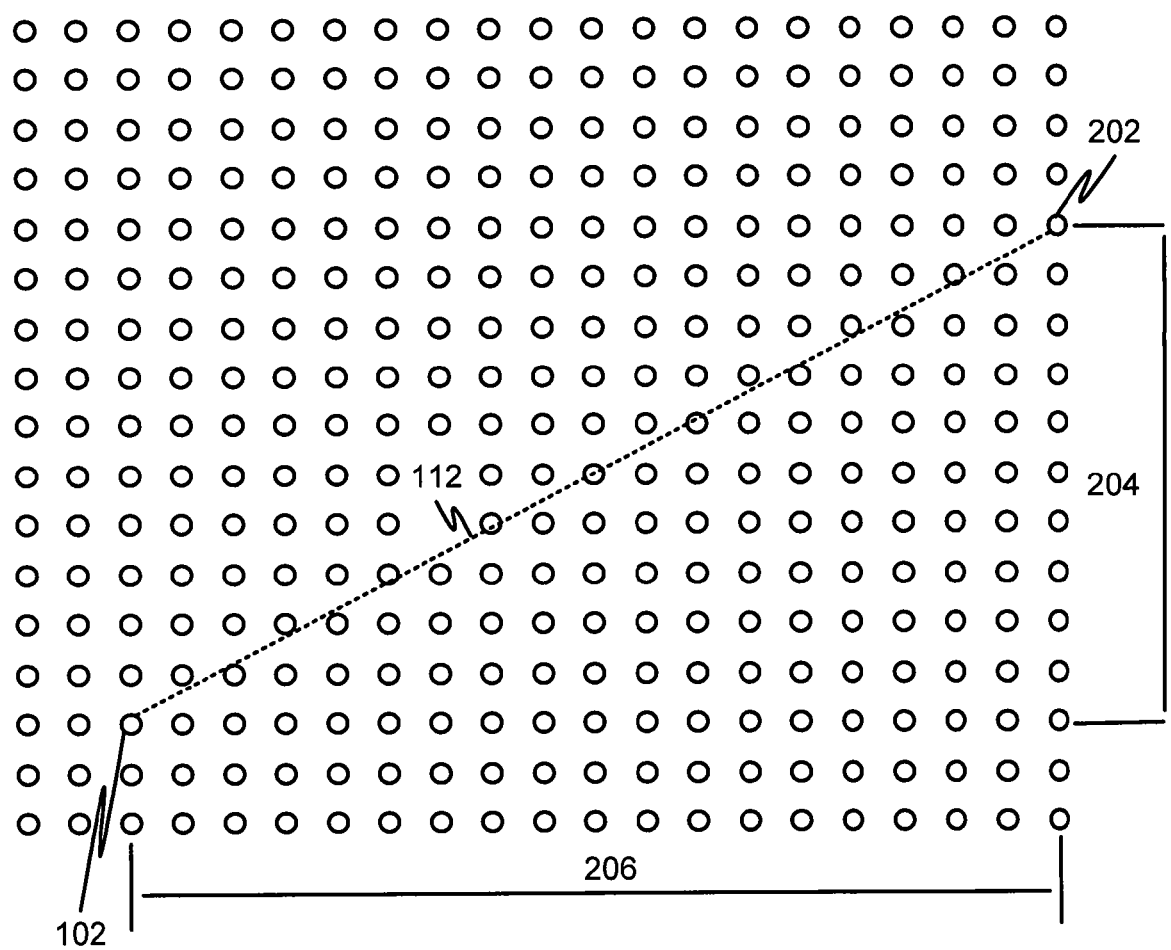
FIG. 2 is a diagram of a portion of an exemplary terrain elevation database cell array showing a line of sight vector.

FIG. 2 is a diagram of a portion of an exemplary terrain elevation database cell array showing a line of sight vector. In particular, a line of sight vector 112 extends from a threat location 102 to an endpoint 202. The endpoint 202 represents a point at the range extent of the threat. The line of sight vector 112 has a change in x-axis position 206 and a change in y-axis position 204.

Figure 3:
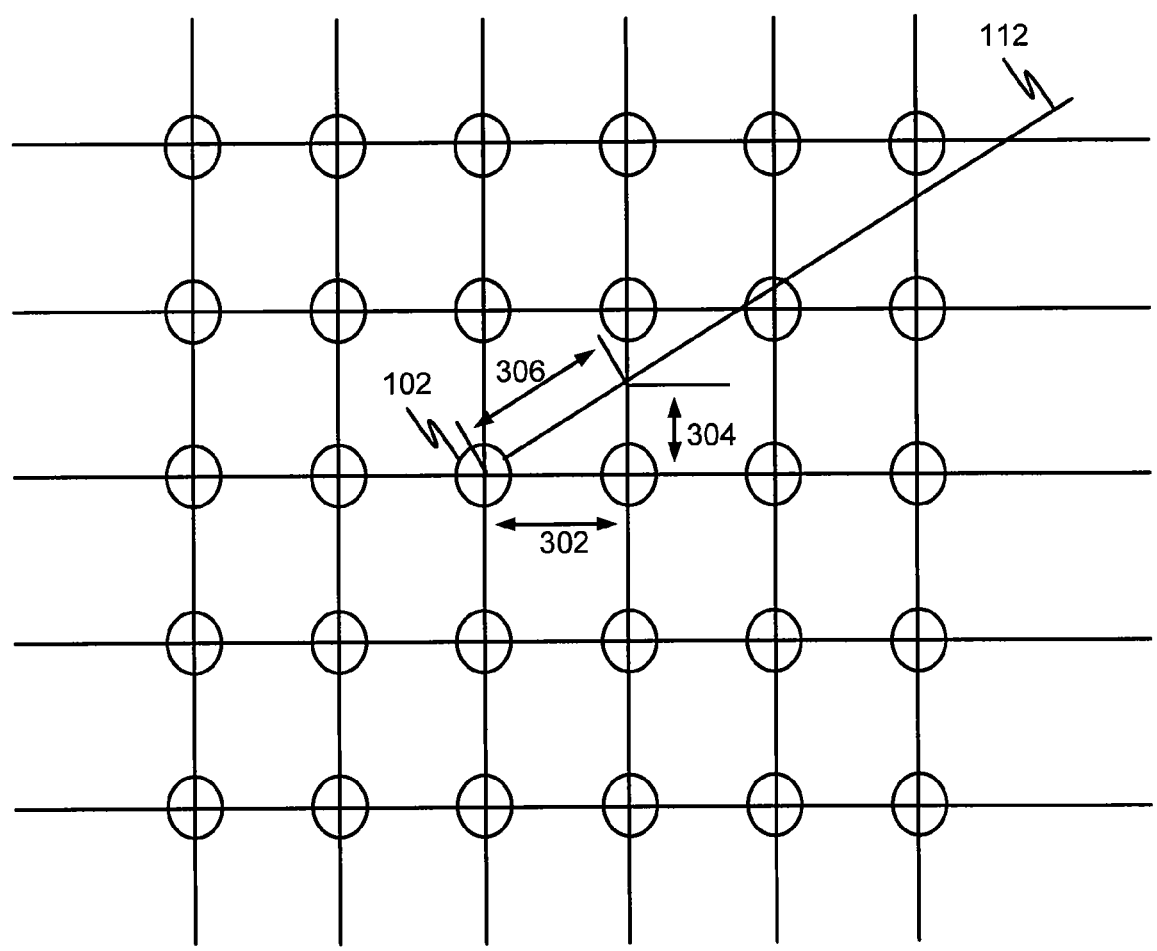
FIG. 3 is a diagram of a portion of an exemplary terrain elevation database cell array showing incremental distances.

FIG. 3 is a diagram of a portion of an exemplary terrain elevation database cell array showing incremental distances. In particular, the line of sight vector 112 emanating from a threat location 102 has associated incremental distances for each step traversed along the line of sight 112. The incremental distances are an x-axis distance 302, a y-axis distance 304, and a hypotenuse distance 306.

Figure 4:
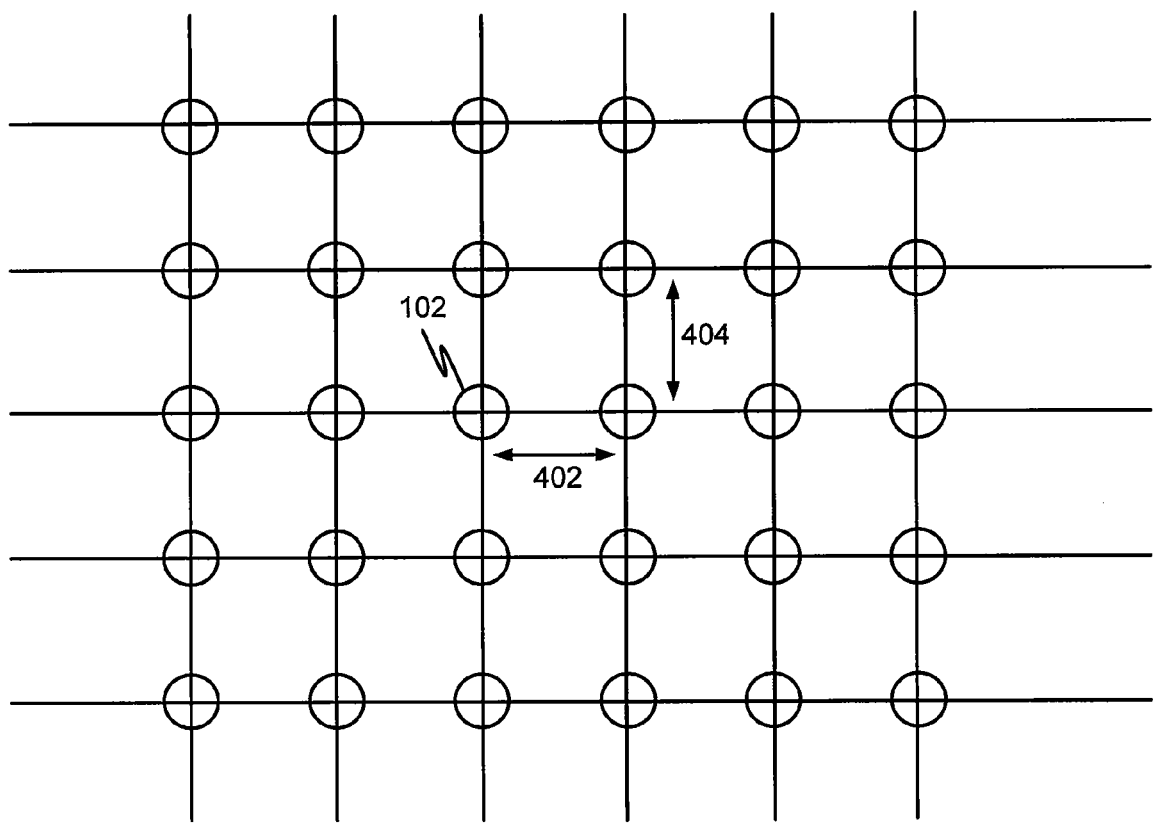
FIG. 4 is a diagram of a portion of an exemplary terrain elevation database cell array showing the size of a cell.

FIG. 4 is a diagram of a portion of an exemplary terrain elevation database cell array showing the size of a cell. In particular, in an exemplary embodiment, each cell in the terrain elevation database has an even spacing in the x-axis 402 and an even spacing in the y-axis 404 over the entire terrain elevation database.

In order to illustrate the methods and systems of the present invention, an example intervisibility determination along a line of sight vector will be described. It should be appreciated that this is an example for illustration purposes and represents an exemplary terrain elevation database and an exemplary embodiment of the present invention.

Figure 5:
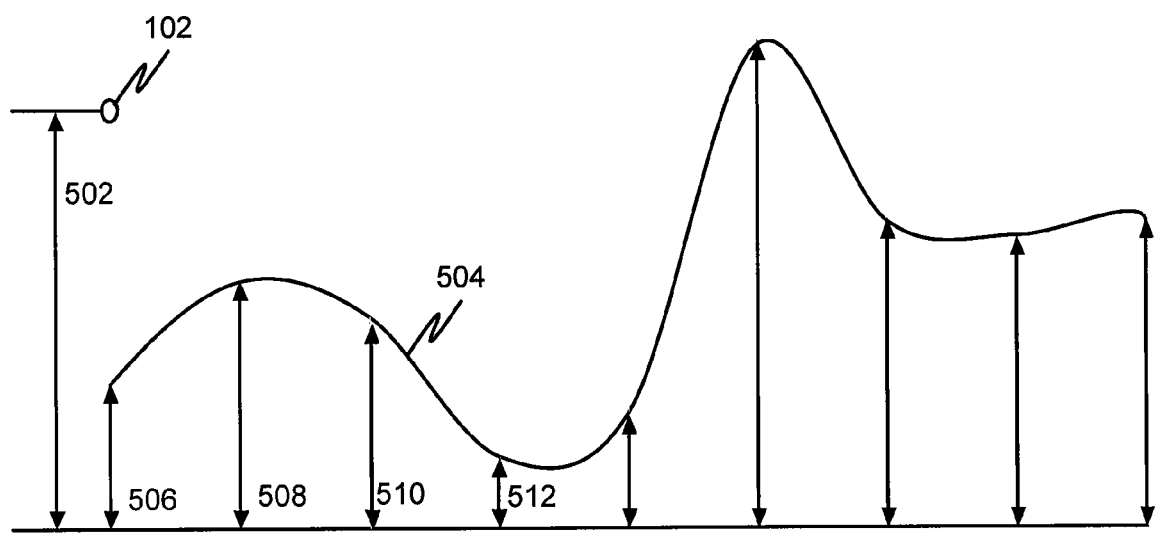
FIG. 5 is a diagram showing a profile view of an exemplary line of sight vector and the terrain values associated therewith.

FIG. 5 is a diagram showing a profile view of an exemplary line of sight vector and the terrain values associated therewith. In particular, a threat location 102 is shown at a threat elevation 502. A terrain profile 504 has an elevation at each terrain elevation database cell (506-512).

Figure 6:
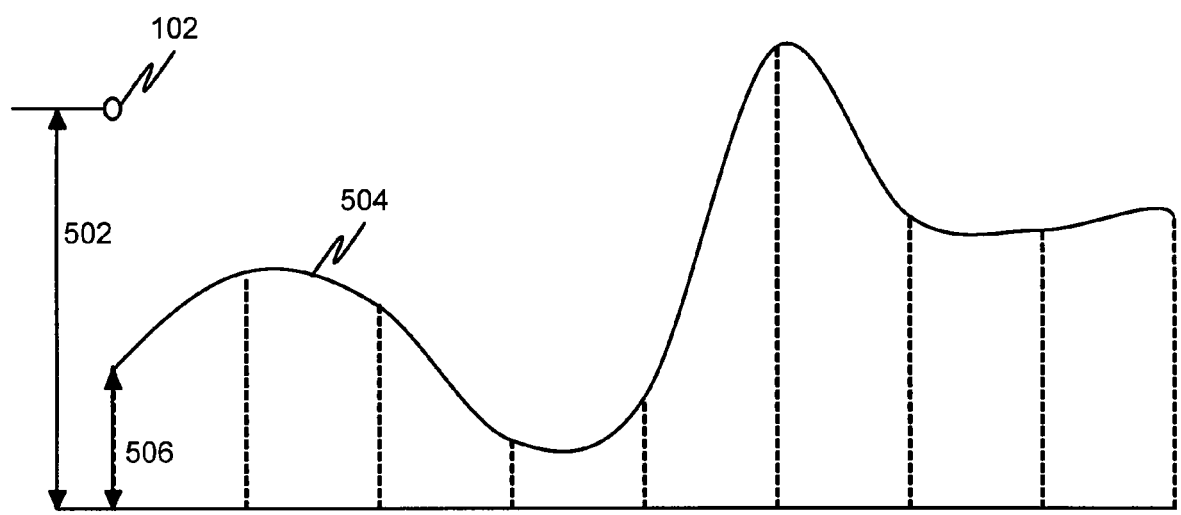
FIG. 6 is a diagram of a profile view of an exemplary line of sight vector and associated terrain elevation values showing a first intervisibility calculation.

FIG. 6 is a diagram of a profile view of an exemplary line of sight vector and associated terrain elevation values showing a first intervisibility calculation. In particular, a threat location 102, a threat elevation 502 and a terrain elevation of the first cell 506 are shown.

In operation, the umbra value for the first cell at the threat location 102 is calculated as the terrain elevation of the first cell 506 along the line of sight vector.

Figure 7:
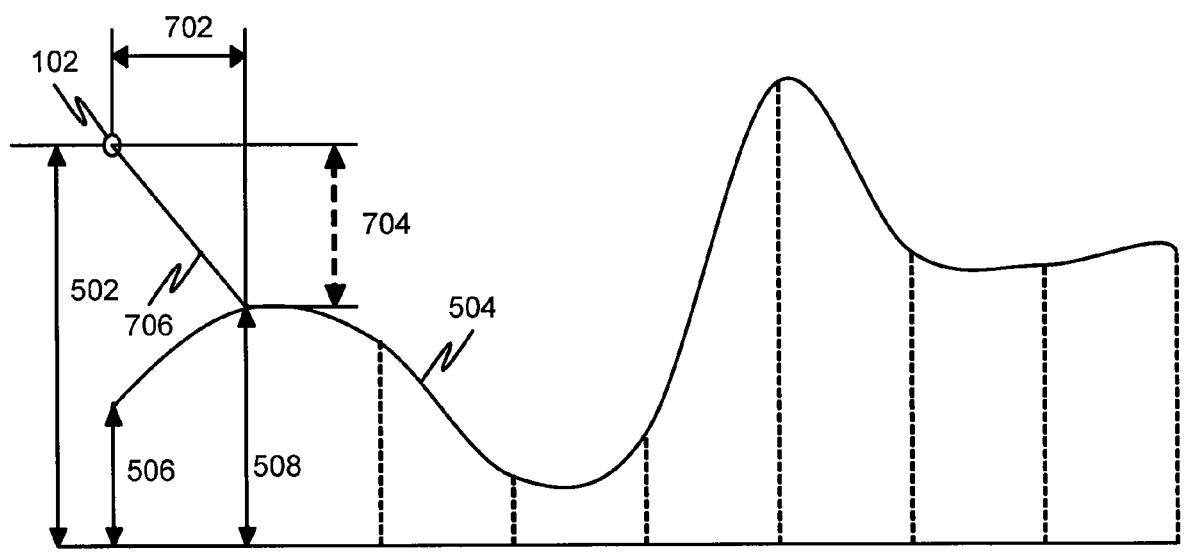
FIG. 7 is a diagram of a profile view of an exemplary line of sight vector and associated terrain elevation values showing a second intervisibility calculation.

FIG. 7 is a diagram of a profile view of an exemplary line of sight vector and associated terrain elevation values showing a second intervisibility calculation. In particular, a threat location 102, a terrain profile 504, a threat elevation 502, a distance increment 702, a change in elevation 704, a viewing angle vector 706 and an elevation at a second cell 508 are shown.

In operation, the umbra value for the second location is calculated as the elevation of the second cell 508 and is stored in the umbra database at the corresponding location. The change in elevation value 704 is calculated as the difference between the threat elevation 502 and the elevation of the second cell 508 divided by the number of steps taken along the line of sight vector. Further, the change in elevation 704 is stored for future use in a next cell calculation.

Figure 8:
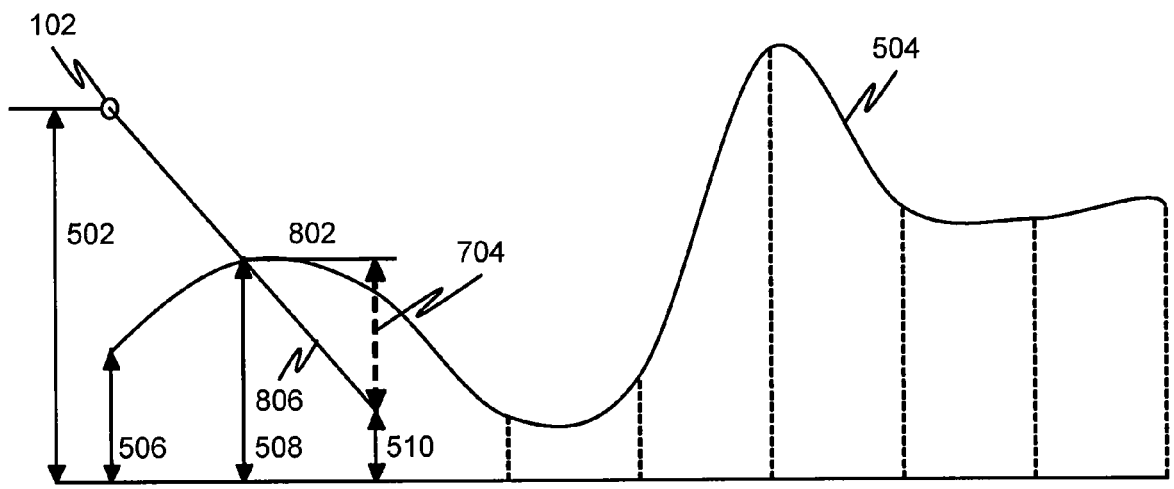
FIG. 8 is a diagram of a profile view of an exemplary line of sight vector and associated terrain elevation values showing a preliminary third intervisibility calculation.

FIG. 8 is a diagram of a profile view of an exemplary line of sight vector and associated terrain elevation values showing a preliminary third intervisibility calculation. In particular, a threat location 102, a terrain profile 504, a threat elevation 502, a first umbra value 506, a second umbra value 508, an umbra value 510, a third umbra value starting point 802 and a difference in elevation factor 704 are shown.

In operation, the calculation of the umbra value at the third step along the line of sight vector begins by establishing an elevation of the previous umbra value. In this case, the value of the second umbra value 508 is used as a third umbra value starting point 802. Next, the difference in elevation factor 704 is applied. The resulting predicted umbra value 510 is the difference between the third umbra value starting point 802 and the difference in elevation factor 704. However, the predicted umbra value 510 is below the terrain elevation for the third data post and a corrected umbra value must be calculated.

Figure 9:
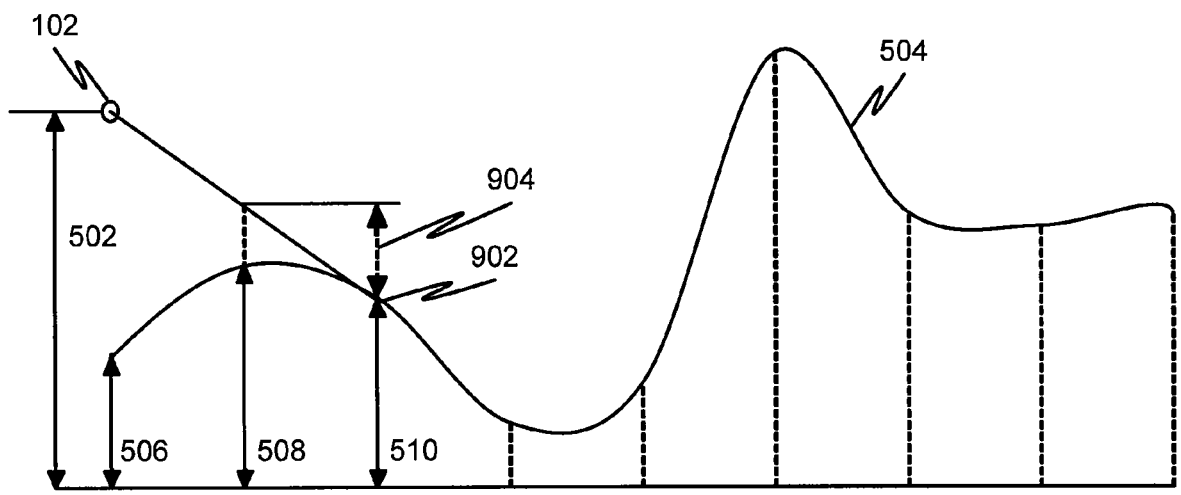
FIG. 9 is a diagram of a profile view of an exemplary line of sight vector and associated terrain elevation values showing a re-computed third intervisibility calculation.

FIG. 9 is a diagram of a profile view of an exemplary line of sight vector and associated terrain elevation values showing a re-computed third intervisibility calculation. In particular, a threat location 102, a terrain profile 504, a threat elevation 502, a first umbra value 506, a second umbra value 508, an umbra value 510, a terrain reference point 902 and a difference in elevation value 904 are shown.

In operation, the umbra value must be recalculated because the value first arrived at was below the terrain elevation value. The new umbra value 510 is recalculated as the terrain elevation at the reference point 902. The new difference in elevation factor 904 is computed as the change in elevation between the threat location 102 and the reference point 902 divided by the number of steps taken along the line of sight vector. In this case the number of steps is two. In other words, the new difference in elevation factor 904 is a change in elevation per step value. This change in elevation per step value is used in order to predict an umbra value for one or more succeeding steps. If the predicted umbra value is reasonable (i.e. above the terrain), then the change in elevation value will continue to be used. If the predicted umbra value is determined to be unreasonable (i.e. below the terrain), then the change in elevation value is recomputed at that point, according to the method described above.

Figure 10:
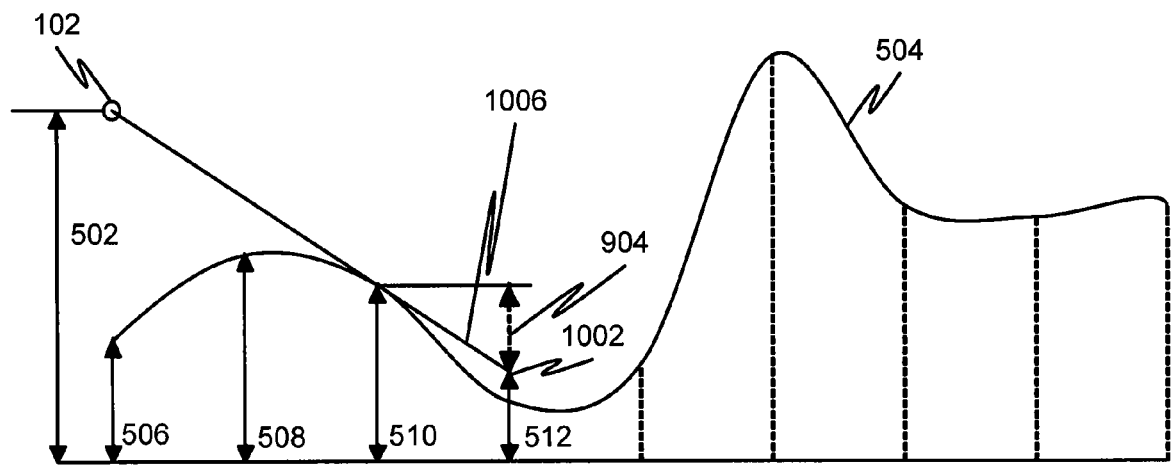
FIG. 10 is a diagram of a profile view of an exemplary line of sight vector and associated terrain elevation values showing a fourth intervisibility calculation.

FIG. 10 is a diagram of a profile view of an exemplary line of sight vector and associated terrain elevation values showing a fourth intervisibility calculation. In particular, a threat location 102, a terrain profile 504, a threat elevation 502, a first umbra value 506, a second umbra value 508, a third umbra value 510, a predicted umbra value 1002 and a difference in elevation factor 904 are shown.

In operation, the predicted umbra value has been calculated at the third step along the line of sight vector begins by establishing an elevation of the previous umbra value. In this case, the value of the fourth umbra value 510 is used as a starting point. Next, the difference in elevation factor 904 is applied. The resulting predicted umbra value 1002 is the difference between the third umbra value and the difference in elevation factor 904 (or an incrementing of the previous predicted umbra value by the change in elevation per step value). The predicted umbra value 512 is at a point 1002 above the terrain elevation for the fourth data post and is stored as the umbra value for the third step along the line of sight vector. The predicted umbra value is then incremented by the difference in elevation factor 904 to arrive at a new predicted umbra value to be used in a next step.

Figure 11:
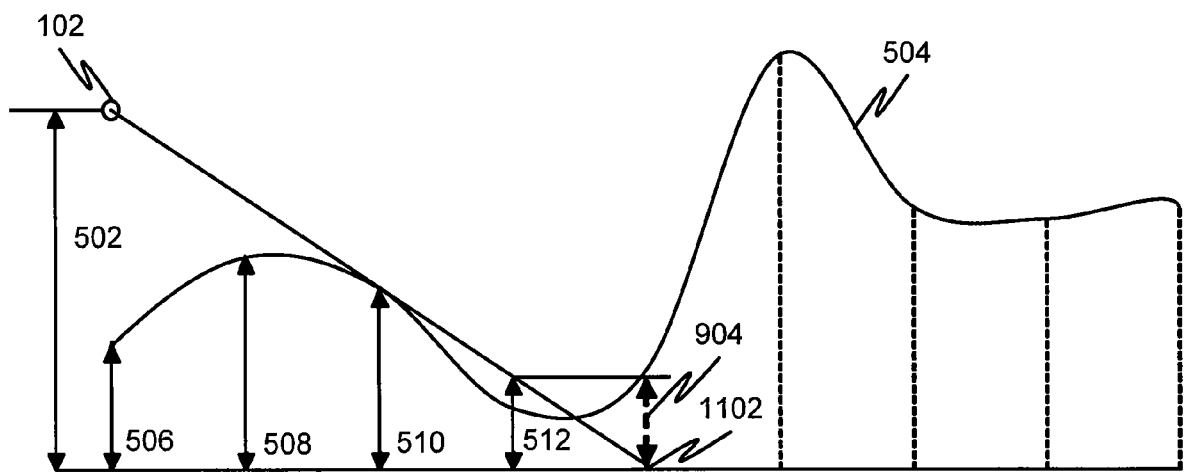
FIG. 11 is a diagram of a profile view of an exemplary line of sight vector and associated terrain elevation values showing a preliminary fifth intervisibility calculation.

FIG. 11 is a diagram of a profile view of an exemplary line of sight vector and associated terrain elevation values showing a preliminary fifth intervisibility calculation. In particular, a threat location 102, a terrain profile 504, a threat elevation 502, a first umbra value 506, a second umbra value 508, a third umbra value 510, a fourth umbra value 512, a predicted umbra value 1102, and a difference in elevation factor 904 are shown.

In operation, the calculation of the umbra value at a fourth step along the line of sight vector begins by establishing an elevation of the previous umbra value. In this case, the value of the fourth umbra value 512 is used as a starting point. Next, the difference in elevation factor 904 is applied. The resulting predicted umbra value 1106 is the difference between the fourth umbra value starting point 512 and the difference in elevation factor 904. However, the predicted umbra value 1106 is at a point 1102 below the terrain elevation for the fifth data post and a corrected umbra value must be calculated.

Figure 12:
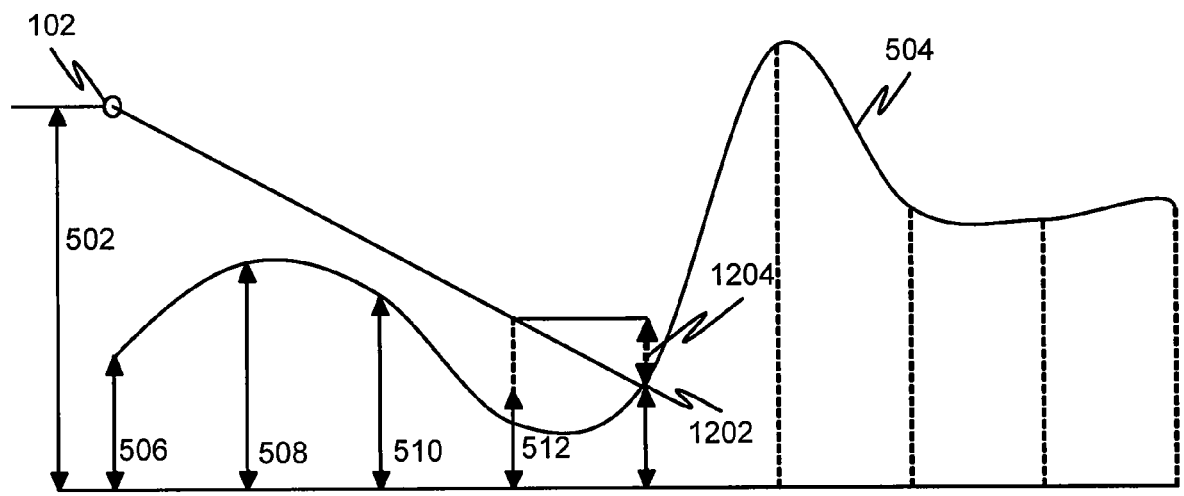
FIG. 12 is a diagram of a profile view of an exemplary line of sight vector and associated terrain elevation values showing a re-computed fifth intervisibility calculation.

FIG. 12 is a diagram of a profile view of an exemplary line of sight vector and associated terrain elevation values showing a re-computed fifth intervisibility calculation. In particular, a threat location 102, a terrain profile 504, a threat elevation 502, a first umbra value 506, a second umbra value 508, a third umbra value 510, a fourth umbra value 512, a recalculated umbra value 1202, and a difference in elevation factor 1204 are shown.

In operation, the umbra value must be recalculated because the value first arrived at was below the terrain elevation value. The new umbra value 1206 is recalculated as the terrain elevation at the fifth data post 1202. The recomputed difference in elevation factor 1204 is calculated as the change in elevation between the elevation at the fifth data post 1202 and the threat location 502, divided by the number of steps taken along the line of sight vector. In this case the number of steps is four. The recomputed difference in elevation value 1204 is stored for use in a next umbra calculation.

Figure 13:
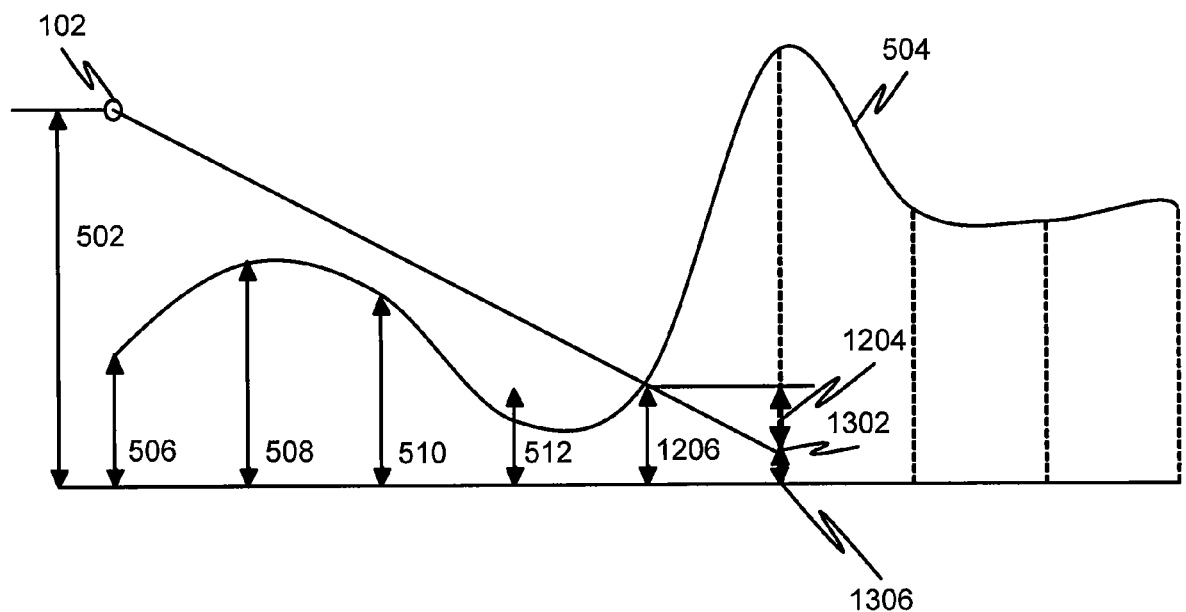
FIG. 13 is a diagram of a profile view of an exemplary line of sight vector and associated terrain elevation values showing a preliminary sixth intervisibility calculation.

FIG. 13 is a diagram of a profile view of an exemplary line of sight vector and associated terrain elevation values showing a preliminary sixth intervisibility calculation. In particular, a threat location 102, a terrain profile 504, a threat elevation 502, a first umbra value 506, a second umbra value 508, a third umbra value 510, a fourth umbra value 512, a fifth umbra value 1206, a predicted elevation point 1302, a predicted umbra value 1306, and a difference in elevation factor 1204 are shown.

In operation, the calculation of the umbra value at a fifth step along the line of sight vector begins by establishing an elevation of the previous umbra value. In this case, the value of the fifth umbra value 1206 is used as a starting point. Next, the difference in elevation factor 1204 is applied. The resulting predicted umbra value 1306 is the difference between the fifth umbra value starting point 1206 and the difference in elevation factor 1204. However, the predicted umbra value 1306 is at a point 1302 below the terrain elevation for the sixth data post and a corrected umbra value must be calculated.

Figure 14:
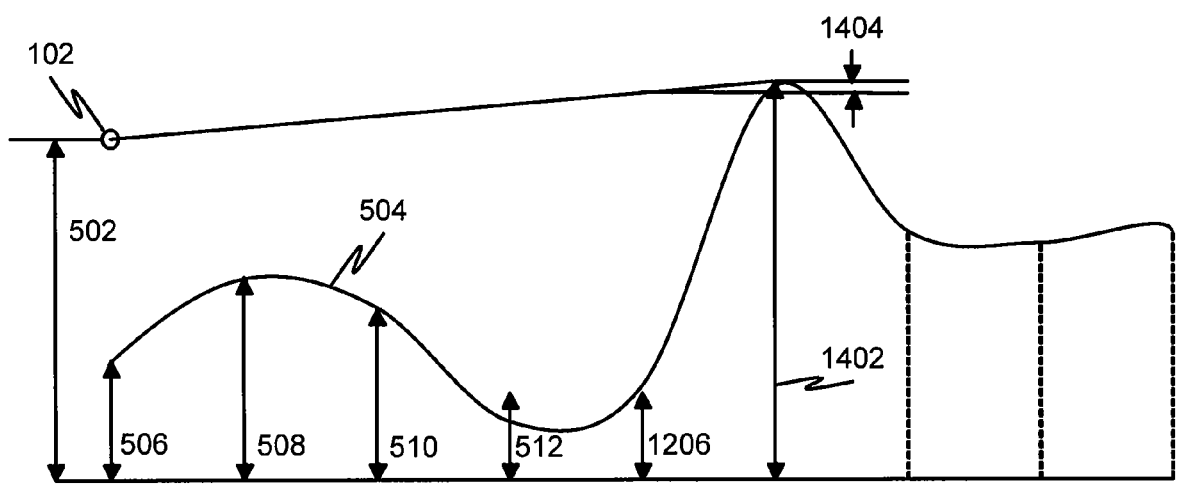
FIG. 14 is a diagram of a profile view of an exemplary line of sight vector and associated terrain elevation values showing a re-computed sixth intervisibility calculation.

FIG. 14 is a diagram of a profile view of an exemplary line of sight vector and associated terrain elevation values showing a re-computed sixth intervisibility calculation. In particular, a threat location 102, a terrain profile 504, a threat elevation 502, a first umbra value 506, a second umbra value 508, a third umbra value 510, a fourth umbra value 512, a fifth umbra value 1206, a recomputed difference in elevation value 1404 and a recomputed umbra value 1402 are shown.

In operation, the recomputed sixth umbra value 1402 has been calculated as the terrain elevation at the sixth data post on the line of sight vector. The recomputed sixth umbra value is stored in the umbra database at the location corresponding to the sixth data post location. The recomputed difference in elevation value 1404 has been calculated as the difference between the terrain elevation at the sixth data post 1402 and the threat elevation 502, divided by the number of steps taken along the line of sight vector (i.e. five, in this case). The recomputed difference in elevation value 1404 is stored for use in a next umbra calculation. A next predicted umbra value is computed by summing the current umbra value and the difference in elevation value 1404.

Figure 15:
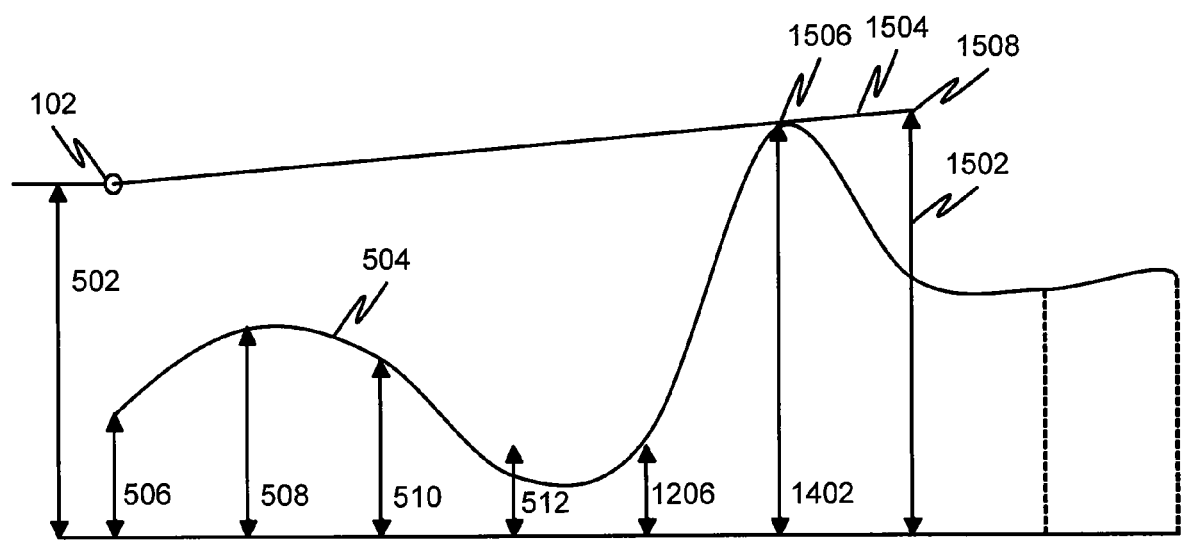
FIG. 15 is a diagram of a profile view of an exemplary line of sight vector and associated terrain elevation values showing a seventh intervisibility calculation.

FIG. 15 is a diagram of a profile view of an exemplary line of sight vector and associated terrain elevation values showing a seventh intervisibility calculation. In particular, a threat location 102, a terrain profile 504, a threat elevation 502, a first umbra value 506, a second umbra value 508, a third umbra value 510, a fourth umbra value 512, a fifth umbra value 1206, a sixth umbra value 1402, a seventh umbra value 1502 are shown.

In operation, the predicted umbra value is calculated as the elevation value of the sixth umbra value 1402 plus the stored change in elevation value 1404 (from FIG. 14). The resulting sum is the seventh umbra value 1502, which is above the terrain elevation at a seventh data post. Accordingly, the seventh umbra value 1502 is stored in the umbra database and the difference in elevation value 1404 continues to be stored for use in a next umbra calculation. A next predicted umbra value is computed by summing the current umbra value (1502) and the difference in elevation value 1404.

Figure 16:
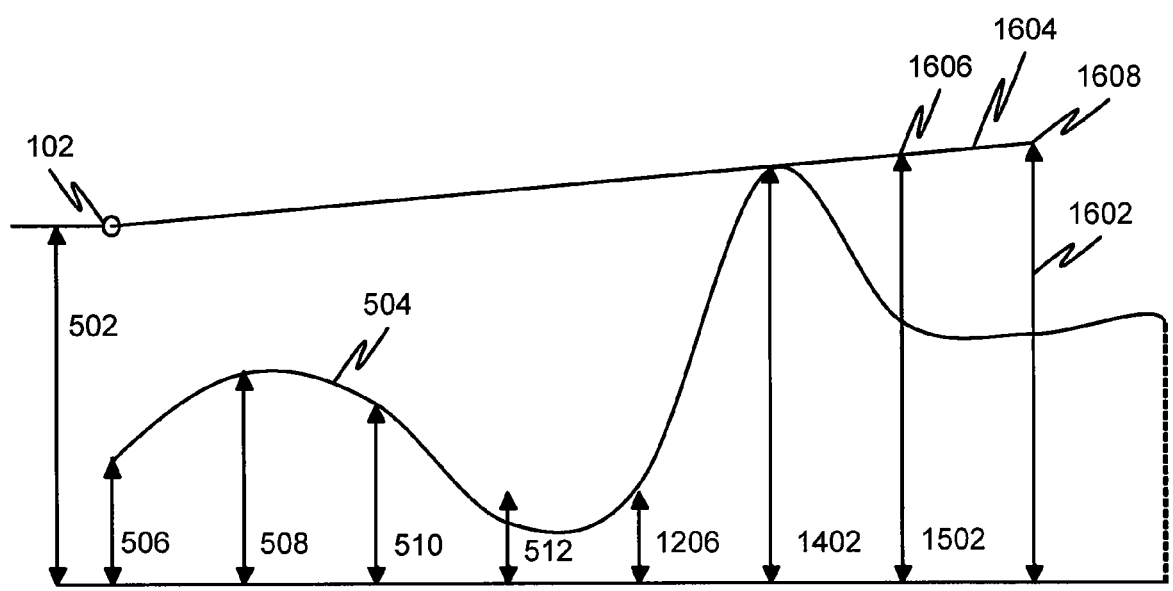
FIG. 16 is a diagram of a profile view of an exemplary line of sight vector and associated terrain elevation values showing an eighth intervisibility calculation.

FIG. 16 is a diagram of a profile view of an exemplary line of sight vector and associated terrain elevation values showing an eighth intervisibility calculation. In particular, a threat location 102, a terrain profile 504, a threat elevation 502, a first umbra value 506, a second umbra value 508, a third umbra value 510, a fourth umbra value 512, a fifth umbra value 1206, a sixth umbra value 1402, a seventh umbra value 1502 and a predicted umbra value 1602 are shown.

In operation, the predicted umbra value 1602 is calculated as the elevation value of the seventh umbra value 1502 plus the stored change in elevation value 1404 (from FIG. 14). The resulting sum is the eighth umbra value 1602, which is above the terrain elevation at an eighth data post. Accordingly, the eighth umbra value 1602 is stored in the umbra database and the difference in elevation value 1404 continues to be stored for use in a next umbra calculation. A next predicted umbra value is computed by summing the current umbra value (1602) and the difference in elevation value 1404.

Figure 17:
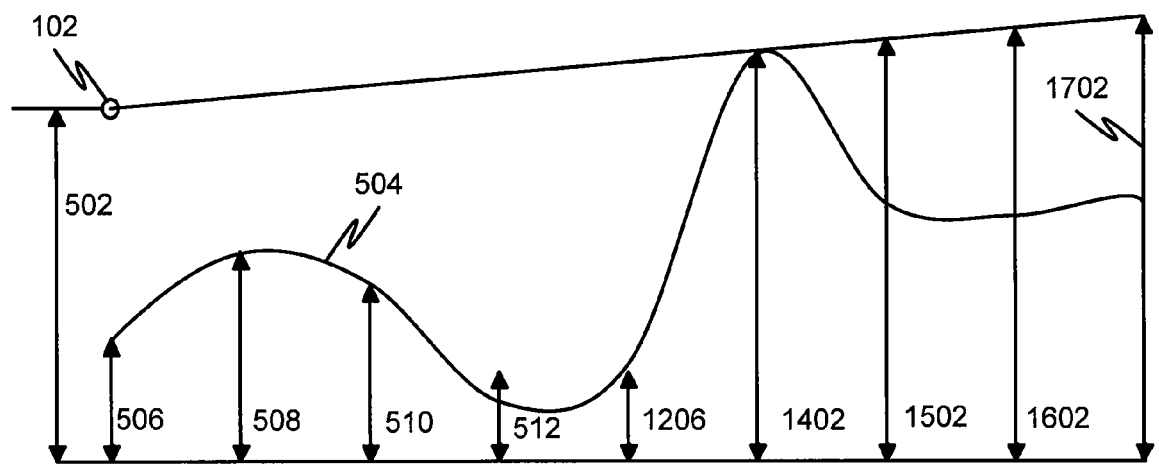
FIG. 17 is a diagram of a profile view of an exemplary line of sight vector and associated terrain elevation values showing a ninth intervisibility calculation.

FIG. 17 is a diagram of a profile view of an exemplary line of sight vector and associated terrain elevation values showing a ninth intervisibility calculation. In particular, a threat location 102, a terrain profile 504, a threat elevation 502, a first umbra value 506, a second umbra value 508, a third umbra value 510, a fourth umbra value 512, a fifth umbra value 1206, a sixth umbra value 1402, a seventh umbra value 1502, an eighth umbra value 1602 and a ninth umbra value 1702 are shown.

In operation, the ninth umbra value 1702 is calculated as the elevation value of the eighth umbra value 1602 plus the stored change in elevation value 1404 (from FIG. 14). The resulting sum is the ninth umbra value 1702, which is above the terrain elevation at a ninth data post. Accordingly, the ninth umbra value 1702 is stored in the umbra database and the difference in elevation value 1404 continues to be stored for use in a next umbra calculation.

Figure 18:
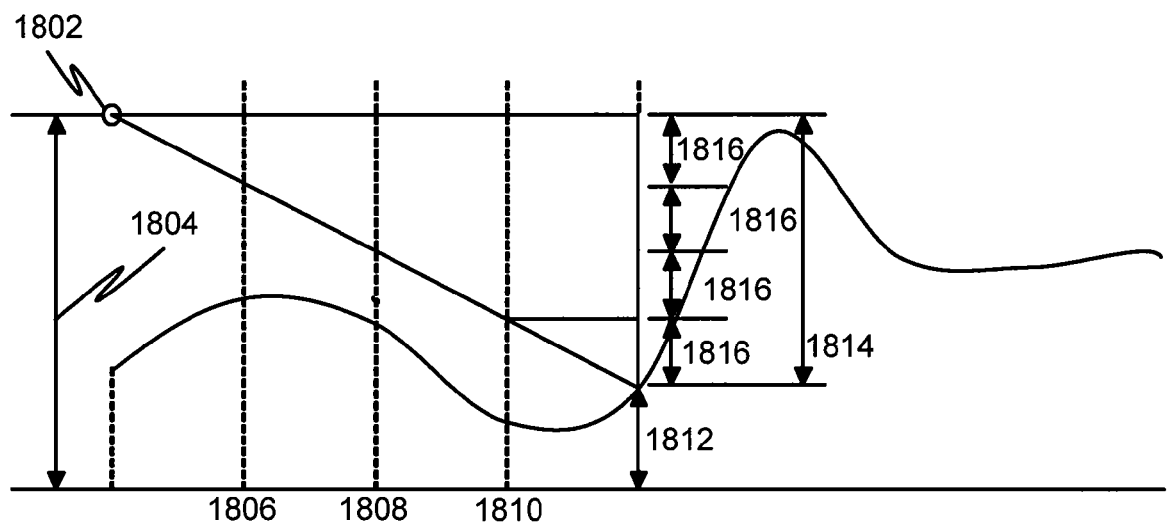
FIG. 18 is a diagram of a profile view of an exemplary line of sight vector and associated terrain elevation values showing an exemplary change in elevation calculation.

FIG. 18 is a diagram of a profile view of an exemplary line of sight vector and associated terrain elevation values showing an exemplary change in elevation calculation. In particular, a threat 1802, a threat elevation 1804, a first step 1806, a second step 1808, a third step 1810, an elevation at a fourth step 1812, a change in elevation 1814 and a change in elevation per step 1816 are shown.

In operation, the change in elevation per step may be calculated as the difference between the elevation at a fourth step 1812 and the threat elevation 1804, divided by the number of steps (i.e. four, in this example). The result is a change in elevation per step 1816. This change in elevation per step may be used in order to predict an umbra value for a succeeding step. If the predicted umbra value is reasonable (i.e. above the terrain), then the change in elevation value will continue to be used. If the predicted umbra value is determined to be unreasonable (i.e. below the terrain), then the change in elevation value is recomputed at that point, according to the method described above.

Figure 19:
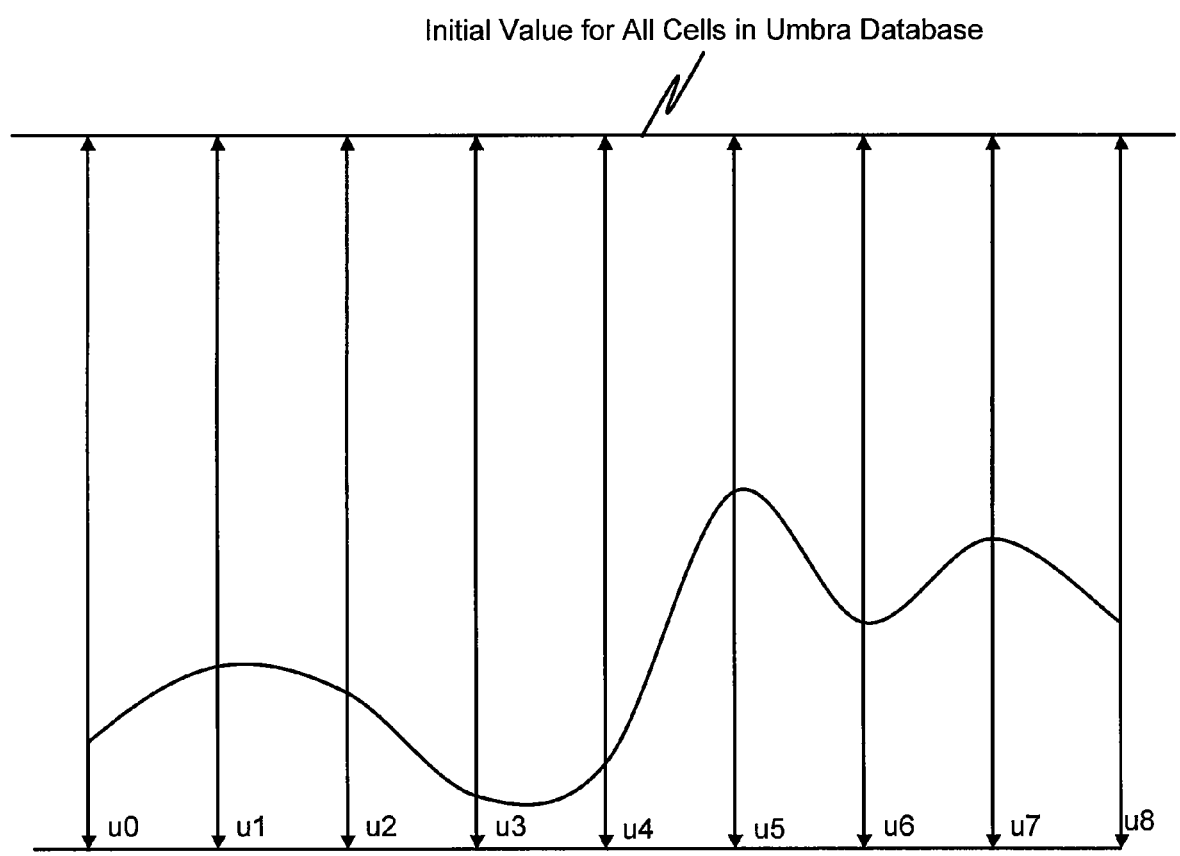
FIG. 19 is a diagram of a profile view of an exemplary line of sight vector and associated terrain elevation values showing an initial umbra database value.

FIG. 19 is a diagram of a profile view of an exemplary line of sight vector and associated terrain elevation values showing an initial umbra database value. In particular, an umbra database is initialized to a large value, for example, the maximum value for the data type being used, such as, for example, 32767, in the case of a 16-bit signed integer data type. This initial value may be stored in all umbra database locations, including those along the line of sight vector (U0-U8).

Figure 20:
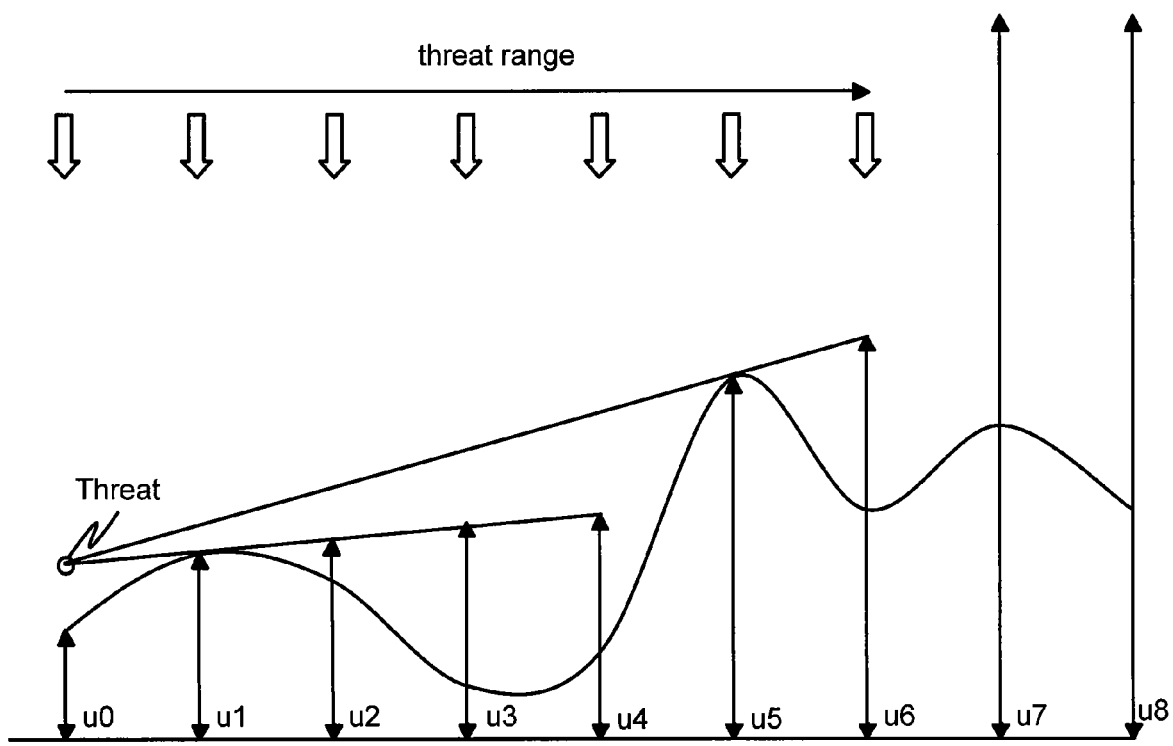
FIG. 20 is a diagram of a profile view of an exemplary line of sight vector and associated terrain elevation values showing exemplary intervisibility values for an exemplary first threat.

FIG. 20 is a diagram of a profile view of an exemplary line of sight vector and associated terrain elevation values showing exemplary intervisibility values for an exemplary first threat. In particular, umbra values have been calculated for the data posts within a threat range (U0-U6), while the remaining data posts U7 and U8 contain an initial value, for example, 32767.

Figure 21:
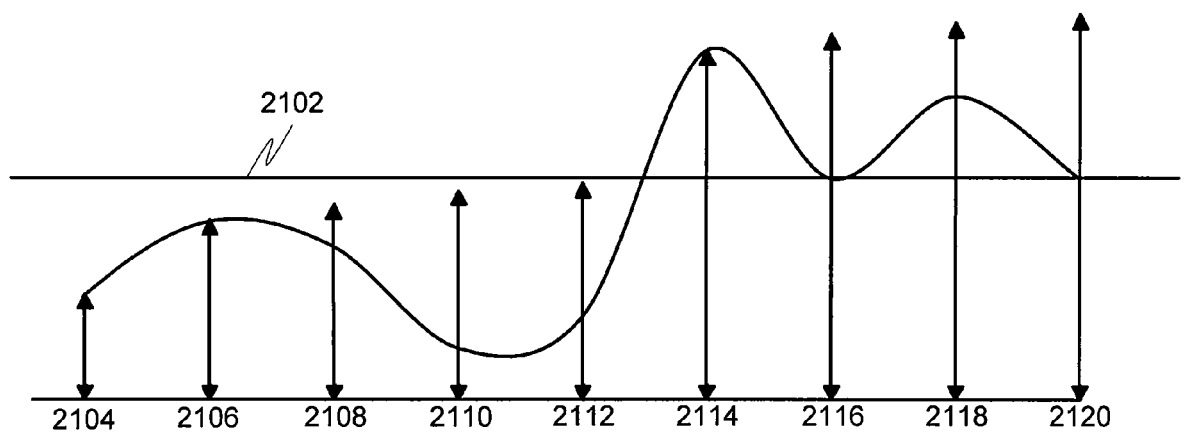
FIG. 21 is a diagram of a profile view of an exemplary line of sight vector and associated terrain elevation values showing mean sea level altitude intervisibility values.

FIG. 21 is a diagram of a profile view of an exemplary line of sight vector and associated terrain elevation values showing a mean sea level elevation used for intervisibility determination. In particular, an MSL elevation 2102 and umbra values for nine data posts (2104-2120) are shown. In operation, intervisibility information may be displayed to an aircraft pilot. The aircraft is potentially visible to the threat at the area of the map corresponding to data posts 2104-2112. Accordingly, the display may show an indication of intervisibility for this area that may alert the pilot to the intervisibility condition, so that the pilot may take appropriate action.

Figure 22:
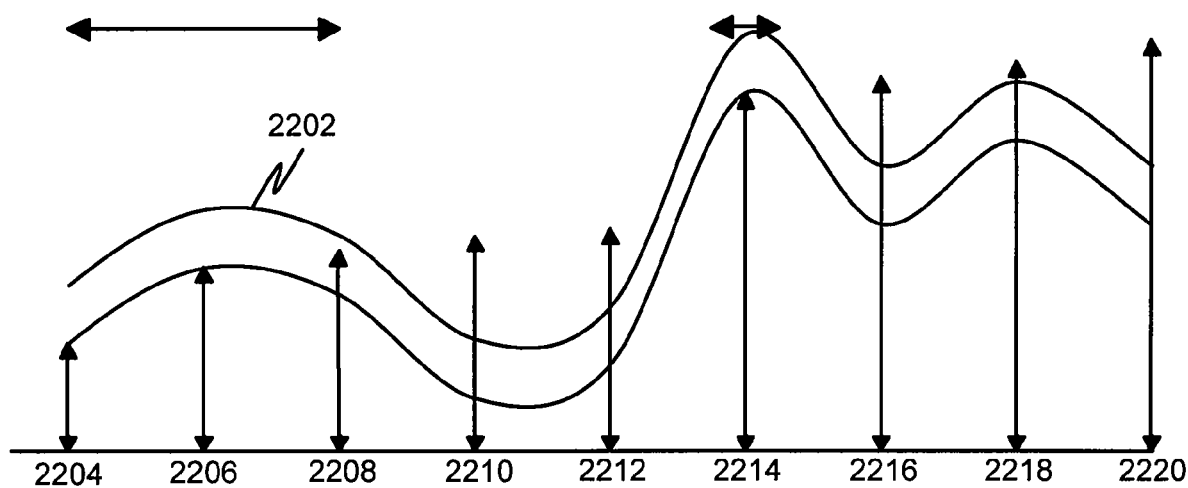
FIG. 22 is a diagram of a profile view of an exemplary line of sight vector and associated terrain elevation values showing above ground level altitude intervisibility values.

FIG. 22 is a diagram of a profile view of an exemplary line of sight vector and associated terrain elevation values showing above ground level (AGL) altitude intervisibility values. In particular, an AGL elevation 2202 is shown, along with umbra values for nine data posts (2204-2220). In operation, intervisibility information may be displayed to an aircraft pilot. Further, if the intervisibility determination is being used in the context of a mission management activity, the intervisibility data may be used for that purpose, such as, for example, in a route-planning algorithm. The aircraft is potentially visible to the threat at the area of the map corresponding to data posts 2204-2208, and 2214, because the AGL elevation of the aircraft determining intervisibility at these data posts is greater than the umbra value at the data posts. Accordingly, the display may show an indication of intervisibility for these areas that may alert the pilot to the intervisibility condition and the pilot may take appropriate action.

Figure 23:
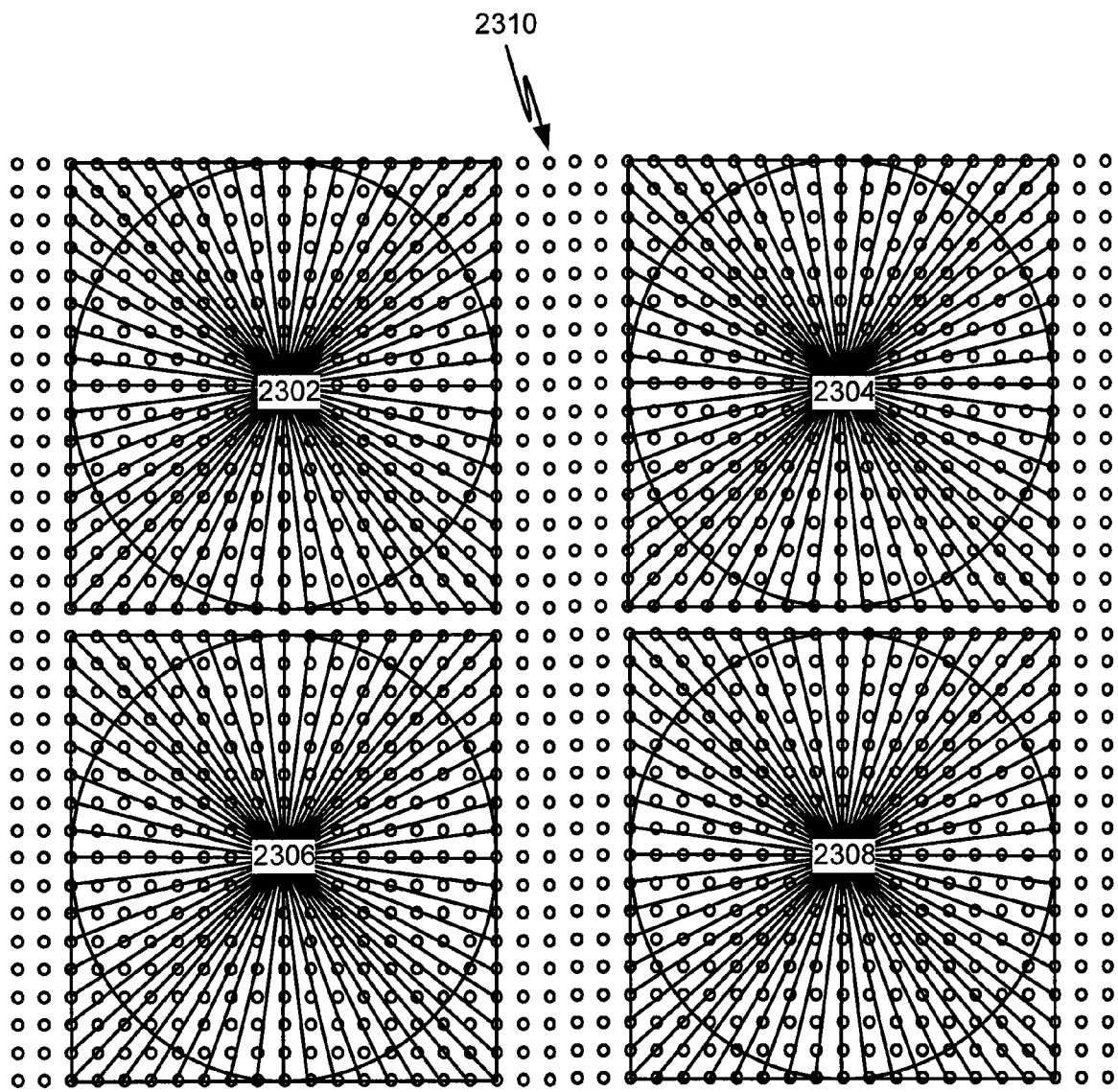
FIG. 23 is a diagram of a portion of an exemplary terrain elevation database cell array showing multiple threats.

FIG. 23 is a diagram of a portion of an exemplary terrain elevation database cell array showing multiple threats. In particular, four threats 2302-2308 are shown overlaid on an exemplary terrain elevation database 2310. The systems and methods of the present invention may be capable of processing multiple threats into an umbra database that contains a composite of the threat intervisibility information.

Figure 24:
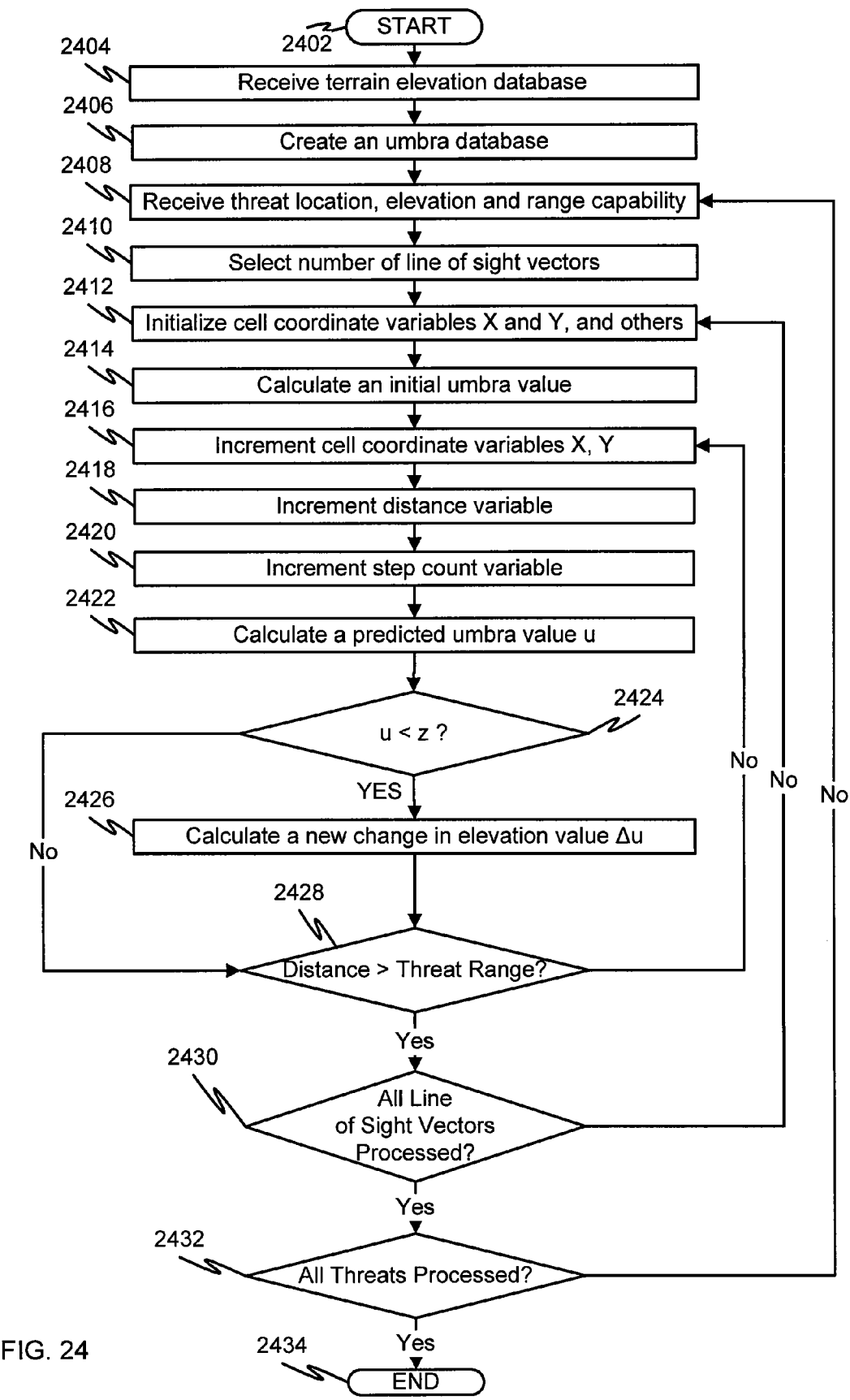
FIG. 24 is a flowchart of a method for determining intervisibility in accordance with the present invention.

FIG. 24 is a flowchart of an exemplary embodiment of a method for determining intervisibility in accordance with the present invention. In particular, control begins at step 2402 and proceeds to step 2404. In step 2404, a terrain elevation database comprising an array of cells corresponding to geographical locations is received. Each terrain elevation database cell contains a value corresponding to terrain elevation at a geographical location represented by the terrain elevation database cell and the terrain represented by each terrain elevation database cell may be constant in both x and y dimensions. Control then continues to step 2406.

In step 2406, an umbra database is created comprising umbra database cells. Each umbra database cell corresponds to a terrain elevation database cell and the terrain represented by each umbra database cell may be constant in both x and y dimensions. The umbra database may correspond to a portion, or all, of a terrain elevation database. In an embodiment where the umbra database covers a portion of the terrain elevation database, the portion may be an area of interest. Control then continues to step 2408. In step 2408, a threat location and a threat range capability is received for all known threats within the area of terrain covered by the terrain elevation database. Control then continues to step 2410.

In step 2410, a number of line of sight vectors to compute for each threat are selected. The number of line of sight vectors may be determined based on the number of cells forming the perimeter of a rectangle (or in a preferred embodiment, a square) bounding the threat and having a length of two times the threat range divided by the distance covered per cell in each of the X and Y axes. This number of line of sight vectors provides an adequate number to process in order to determine threat intervisibility. Control then continues to step 2412. In step 2412, cell coordinate variables X and Y are initialized to the cell coordinate representing a threat location. Also, a distance variable and a step count variable is initialized. Control then continues to step 2414.

In step 2414, an initial umbra value is calculated, wherein the initial umbra value is calculated as the elevation at the location of the threat and stored in the umbra database at the corresponding cell. Control then continues to step 2416.

In step 2416, the cell coordinate variables X and Y are incremented to reference a next cell on the line of sight vector. Depending on the quadrant that the line of sight vector lies in relative to the threat location, the X (or Y) cell coordinate variable may be incremented by 1.0 and the Y (or X) variable may be incremented by a value $\leq 1.0$. For example, in a line of sight vector extending in an easterly direction, the X increment value is 1.0 and the Y increment value is 0.0. In another example, in a line of sight vector extending in a southwesterly direction, the X increment is $-1.0$ and the Y increment is $-1.0$. Control then continues to step 2418. In step 2418, a distance variable is incremented by the value representing the distance taken in each step along the line of sight vector. Control then continues to step 2420.

In step 2420, a variable storing the step count is incremented. Control then continues to step 2422. In step 2422, a predicted umbra value is calculated by summing the present umbra value with the change in elevation value. Control then continues to step 2424. In step 2424, the predicted umbra value is evaluated in order to determine if it is at or above the terrain elevation value. If the predicted umbra value is at or above the terrain elevation value the predicted umbra value is stored in the umbra database and control proceeds to step 2428. However, if the predicted umbra value is not at or above the terrain elevation value, control proceeds to step 2426. In step 2426, the change in elevation factor is recomputed by subtracting the initial elevation value from the current elevation value and dividing the resulting difference by the step count traversed. The new change in elevation value is stored. The terrain elevation value is stored in the umbra database. Control then continues to step 2428.

In step 2428, the distance variable is evaluated. If the distance traversed along the line of sight vector is equal to or greater than the threat range capability of the threat being processed then control continues to step 2430. Otherwise, control continues to step 2416 to continue the cell processing for the current line of sight vector.

In step 2430, the processing ends for the current line of sight vector. The line of sight vectors are evaluated. If all line of sight vectors have been processed, control continues to step 2432. Otherwise, control continues to step 2412 and a next line of sight vector is processed.

In step 2432, the threats received are evaluated. If another threat is available for processing, then control continues to step 2408, where a next threat is processed by repeating the steps 2408-2432, described above. If there are no other threats to process, control continues to step 2434, where intervisibility processing ends for this area of terrain. In addition, steps may be repeated as necessary when a threat moves or a different observation location or altitude is desired as a result of movement by the observer.

In an exemplary embodiment of the present invention, the umbra database may be used to display intervisibility data in an aircraft by coupling the umbra database to a display device of an aircraft. As the altitude and/or location of the aircraft changes, the umbra database may be re-computed. The umbra database may also be re-computed when the presence of threats changes, such as, for example, when a threat enters the area or when a threat is neutralized. The umbra database may also be re-computed in response to an operator command, or in the case of a mission management application, any time a new determination is desired or required, such as, for example, when a new automatic route plan is desired. Once the umbra database has been re-computed, the intervisibility display may be updated in response to the umbra database update.

Threat intervisibility may be computed in terms of altitude above ground level (AGL) or in terms of altitude above mean sea level (MSL).

Threat data may be received from a variety of sources, such as, for example, from a pre-loaded threat information database, from sensors, from a communications message received by the aircraft, and/or the like. Further, the systems and methods of intervisibility determination may be used to compute instantaneous sensor coverage, for example, from an aircraft to the surrounding terrain. In a sensor coverage scenario, no actual threats are involved and the intervisibility calculation is directed from point of view of the aircraft as the "threat" with the surrounding terrain points as the "observation points." Thus, the sensor coverage map depicts the areas where the sensor on board the aircraft is able to detect.

Figure 25:
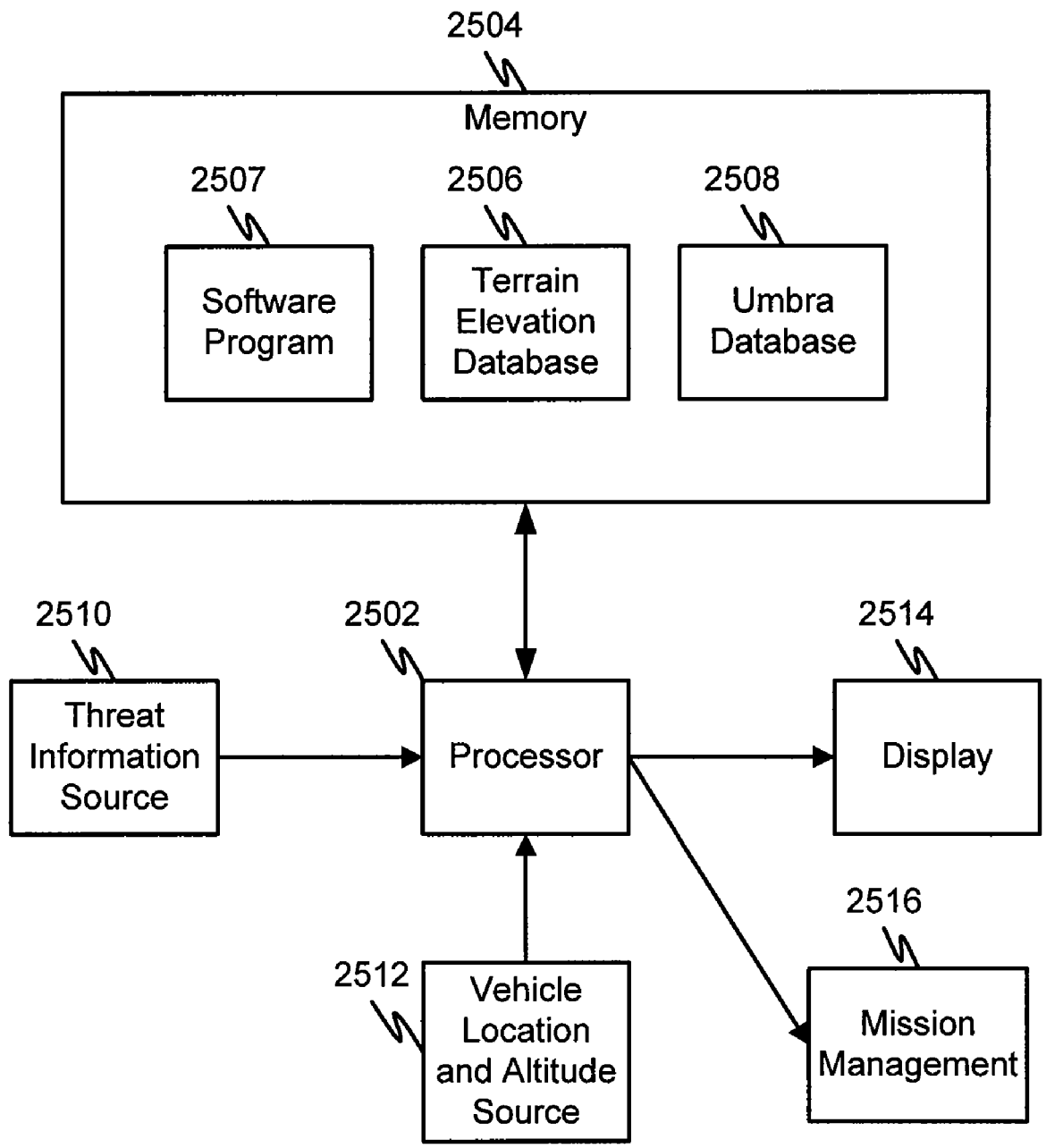
FIG. 25 is a diagram of a system for determining and displaying intervisibility in accordance with the present invention.

FIG. 25 is a diagram of a system for determining and displaying intervisibility in accordance with the present invention. In particular, a processor 2502 is coupled to a memory 2504. The memory 2504 may be a component of the processor or may be a peripheral device of the processor. The memory 2504 comprises at least a portion of a terrain elevation database 2506, a software program 2507 for determining intervisibility in accordance with the present invention and at least a portion of an umbra database 2508. Also shown are a threat information source 2510 and a vehicle location and altitude information source 2512. In addition, an optional display 2514 and an optional mission management module 2516 are shown coupled to the processor 2502.

In operation, the processor 2502 loads the software program 2507, and the terrain elevation database 2506. The processor receives threat information from a threat information source 2510 and stores the threat information in memory. The software program 2507 accesses the terrain elevation database 2506 and the threat information (not shown) in order to calculate the umbra values for storing into the umbra database 2508, for example, by using the exemplary embodiment of the method described above. Once the umbra database has been populated with umbra values, the processor 2502 receives the vehicle and location information from the vehicle location and altitude source 2512. The software program 2507 uses the vehicle location and altitude information (not shown) along with the umbra database 2508 in order to determine the intervisibility for the vehicle. Optionally, the intervisibility information is displayed on the display 2514. Also, the intervisibility information may optionally be sent to the mission management module 2516 for use in various mission management applications in accordance with a contemplated use of the invention.

The intervisibility determination methods and systems, as shown in the above figures, may be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement a system for determining intervisibility according to this invention.

Furthermore, the disclosed system may be readily implemented in software using object or object-oriented software development environments that provide portable source code that can be used on a variety of computer platforms. Alternatively, the disclosed system for intervisibility determination may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The intervisibility determination system illustrated herein can readily be implemented in hardware and/or software using any known or later developed systems or structures, devices and/or software by those of ordinary skill in the applicable art from the functional description provided herein and with a general basic knowledge of the computer and mark-up language arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of an image processor.

It is, therefore, apparent that there is provided in accordance with the present invention, systems and methods for intervisibility determination and display. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A computer program product for determining threat intervisibility, comprising:

software instructions for enabling the computer to perform predetermined operations; and a computer readable medium bearing the software instructions;

the predetermined operations including the steps of:

receiving a terrain elevation database comprising a plurality of data points, wherein each data point corresponds to a geographic location, wherein adjacent geographic locations are uniformly spaced in each of a first direction and a second direction perpendicular to said first direction, and wherein each data point represents a terrain elevation of the geographic location corresponding to the data point;

creating an umbra database comprising umbra database cells, wherein each umbra database cell corresponds to a terrain elevation database data point;

receiving a threat location and a threat range capability for one or more threats within an area of terrain covered by the terrain elevation database;

determining a line of sight vector to compute for the threat;

initializing cell coordinate variables X and Y to cell coordinates representing the threat location;

initializing a distance variable and a step count variable;

calculating an initial umbra value, wherein the initial umbra value is calculated as the elevation of the ground at the threat location and stored in the umbra database in the umbra database cell corresponding to the threat location;

incrementing the cell coordinate variables X and Y to reference a next cell on the line of sight vector;

incrementing the distance variable by a distance represented by each step along the first line of sight vector;

incrementing the step count variable;

calculating a change in elevation value at a second step along a line of sight vector being processed and storing said change in elevation value, wherein the change in elevation value is calculated as the difference between a current terrain elevation value and the threat elevation, divided by a value of the step count variable;

calculating a predicted umbra value by summing the change in elevation value with a preceding umbra value;

if the predicted umbra value is at or above the current terrain elevation value, then storing the predicted umbra value in the umbra database, otherwise, recomputing the change in elevation factor by subtracting the initial elevation value from the current terrain elevation value and dividing the resulting difference by the step count and storing the current terrain elevation value in the umbra database;

if the distance variable value is equal to or greater than the threat range capability of the threat being processed, ending processing for the line of sight vector, otherwise, continuing processing of the line of sight vector by repeating the steps of incrementing the cell coordinate variables X and Y, incrementing the distance variable, incrementing the step count variable, calculating a change in elevation value, calculating a predicted umbra value; and if the line of sight vector processing is complete and the threat processing is complete, then ending intervisibility processing.

2. The computer program product of claim 1, wherein the predetermined operations further include displaying at least a portion of intervisibility data in response to operator input.

3. The computer program product of claim 1, wherein the predetermined operations further include communicating via a communications link.

4. The computer program product of claim 3, wherein the communications link receives threat information.

5. The computer program product of claim 3, wherein the communications link transmits threat information.

6. The computer program product of claim 1, wherein the computer program product is adapted to be executed on a portable computer.

7. The computer program product of claim 1, wherein the computer program product is adapted to be executed on board an aircraft.

8. A computer system adapted to calculate intervisibility comprising:

a processor, and a memory including software instructions that cause the computer system to perform the steps of:

receiving a terrain elevation database comprising a plurality of data points, wherein each data point corresponds to a geographic location, wherein adjacent geographic locations are uniformly spaced in each of a first direction and a second direction perpendicular to said first direction, and wherein each data point represents a terrain elevation of the geographic location corresponding to the data point;

creating an umbra database comprising umbra database cells, wherein each umbra database cell corresponds to a terrain elevation database data point;

receiving a threat location and a threat range capability for one or more threats within an area of terrain covered by the terrain elevation database;

determining a line of sight vector to compute for the threat;

initializing cell coordinate variables X and Y to cell coordinates representing the threat location;

initializing a distance variable and a step count variable;

calculating an initial umbra value, wherein the initial umbra value is calculated as the elevation of the ground at the threat location and stored in the umbra database in the umbra database cell corresponding to the threat location;

incrementing the cell coordinate variables X and Y to reference a next cell on the line of sight vector;

incrementing the distance variable by a distance represented by each step along the first line of sight vector;

incrementing the step count variable;

calculating a change in elevation value at a second step along a line of sight vector being processed and storing said change in elevation value, wherein the change in elevation value is calculated as the difference between a current terrain elevation value and the threat elevation, divided by a value of the step count variable;

calculating a predicted umbra value by summing the change in elevation value with a preceding umbra value;

if the predicted umbra value is at or above the current terrain elevation value, then storing the predicted umbra value in the umbra database, otherwise, recomputing the change in elevation factor by subtracting the initial elevation value from the current terrain elevation value and dividing the resulting difference by the step count and storing the current terrain elevation value in the umbra database;

if the distance variable value is equal to or greater than the threat range capability of the threat being processed, ending processing for the line of sight vector, otherwise, continuing processing of the line of sight vector by repeating the steps of incrementing the cell coordinate variables X and Y, incrementing the distance variable, incrementing the step count variable, calculating a change in elevation value, calculating a predicted umbra value; and if the line of sight vector processing is complete and the threat processing is complete, then ending intervisibility processing.

9. The computer system of claim 8, further comprising a display coupled to the processor for displaying at least a portion of intervisibility data in response to operator input.

10. The computer system of claim 8, further comprising a communications link.

11. The computer system of claim 10, wherein the communications link receives threat information.

12. The computer system of claim 10, wherein the communications link transmits threat information.

13. The computer system of claim 9, wherein the computer system is a portable computer.

14. The computer system of claim 9, wherein the computer system is on board an aircraft.

15. A computer program product for determining threat intervisibility, comprising:

software instructions for enabling the computer to perform predetermined operations; and a computer readable medium bearing the software instructions;

the predetermined operations including the steps of:

receiving a terrain elevation database comprising a plurality of data points, wherein each data point corresponds to a geographic location, wherein adjacent geographic locations are uniformly spaced in each of a first direction and a second direction perpendicular to said first direction, and wherein each data point represents a terrain elevation of the geographic location corresponding to the data point;

creating an umbra database comprising umbra database cells, wherein each umbra database cell corresponds to a terrain elevation database data point;

receiving a threat location and a threat range capability for one or more threats within an area of terrain covered by the terrain elevation database;

determining a line of sight vector to compute for the threat;

initializing cell coordinate variables X and Y to cell coordinates representing the threat location;

initializing a distance variable and a step count variable;

calculating an initial umbra value, wherein the initial umbra value is calculated as the elevation of the ground at the threat location and stored in the umbra database in the umbra database cell corresponding to the threat location;

incrementing the cell coordinate variables X and Y to reference a next cell on the line of sight vector;

incrementing the distance variable by a distance represented by each step along the first line of sight vector;

incrementing the step count variable;

calculating a change in elevation value at a second step along a line of sight vector being processed and storing said change in elevation value, wherein the change in elevation value is calculated as the difference between a current terrain elevation value and the threat elevation, divided by a value of the step count variable;

calculating a predicted umbra value by summing the change in elevation value with a preceding umbra value; and if the predicted umbra value is at or above the current terrain elevation value, then storing the predicted umbra value in the umbra database, otherwise, recomputing the change in elevation factor by subtracting the initial elevation value from the current terrain elevation value and dividing the resulting difference by the step count and storing the current terrain elevation value in the umbra database.

16. The computer program product of claim 15, wherein the predetermined operations further include displaying at least a portion of intervisibility data in response to operator input.

17. The computer program product of claim 15, wherein the predetermined operations further include communicating via a communications link.

18. The computer program product of claim 17, wherein the communications link receives threat information.

19. The computer program product of claim 17, wherein the communications link transmits threat information.

20. The computer program product of claim 15, wherein the computer program product is adapted to be executed on a portable computer.

21. The computer program product of claim 15, wherein the computer program product is adapted to be executed on board an aircraft.

* * * * *